US012643963B2

(12) United States Patent
Song et al.

(10) Patent No.: US 12,643,963 B2
(45) Date of Patent: Jun. 2, 2026

(54) POLYETHYLENE AND PREPARATION METHOD THEREOF

(71) Applicant: LG CHEM, LTD., Seoul (KR)

(72) Inventors: Christine Jisoo Song, Daejeon (KR); Jiwon Yoon, Daejeon (KR); Yi Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 561 days.

(21) Appl. No.: 18/038,939

(22) PCT Filed: Nov. 29, 2021

(86) PCT No.: PCT/KR2021/017788

§ 371 (c)(1),
(2) Date: May 25, 2023

(87) PCT Pub. No.: WO2022/114902

PCT Pub. Date: Jun. 2, 2022

(65) Prior Publication Data

US 2024/0026042 A1 Jan. 25, 2024

(30) Foreign Application Priority Data

Nov. 30, 2020 (KR) ........................ 10-2020-0165109
Nov. 26, 2021 (KR) ........................ 10-2021-0166074

(51) Int. Cl.

*C08F 10/02* (2006.01)
*C08F 4/659* (2006.01)
*C08F 4/6592* (2006.01)
*C08F 210/16* (2006.01)

(52) U.S. Cl.

CPC .......... *C08F 10/02* (2013.01); *C08F 4/65912* (2013.01); *C08F 4/6592* (2013.01); *C08F 210/16* (2013.01); *C08F 2420/01* (2013.01); *C08F 2420/08* (2021.01)

(58) Field of Classification Search

CPC .... C08F 10/02; C08F 210/16; C08F 2420/01; C08F 2420/08; C08F 4/6592
See application file for complete search history.

(56) References Cited

U.S. PATENT DOCUMENTS

| | | | | |
|---|---|---|---|---|
| 10,544,247 | B2 | 1/2020 | Kim et al. | |
| 2009/0004489 | A1 | 1/2009 | Laiho et al. | |
| 2010/0069582 | A1 | 3/2010 | Yang et al. | |
| 2011/0171407 | A1 | 7/2011 | Mazzola et al. | |
| 2012/0123013 | A1 | 5/2012 | Ek et al. | |
| 2015/0141599 | A1 | 5/2015 | Greco | |
| 2015/0266985 | A1 | 9/2015 | Uhm et al. | |
| 2017/0260304 | A1 | 9/2017 | Al-Shammari et al. | |
| 2018/0030180 | A1 | 2/2018 | Sung et al. | |
| 2019/0010256 | A1 | 1/2019 | Lee et al. | |
| 2019/0218379 | A1 | 7/2019 | Ribour | |
| 2020/0010584 | A1 | 1/2020 | Hong et al. | |
| 2020/0223962 | A1 | 7/2020 | Kim et al. | |
| 2021/0040294 | A1 | 2/2021 | Chae et al. | |
| 2022/0403070 | A1* | 12/2022 | Kim | C08F 110/02 |

FOREIGN PATENT DOCUMENTS

| | | | | |
|---|---|---|---|---|
| CN | 107840918 | A | 3/2018 | |
| JP | 2006-206500 | A | 8/2006 | |
| KR | 10-1116699 | B1 | 3/2012 | |
| KR | 10-2012-0096875 | A | 8/2012 | |
| KR | 10-2012-0120207 | A | 11/2012 | |
| KR | 10-2017-0106801 | A | 9/2017 | |
| KR | 10-2018-0054356 | A | 5/2018 | |
| KR | 10-2018-0067944 | A | 6/2018 | |
| KR | 20180067944 | A * | 6/2018 | C08F 4/65922 |
| KR | 10-2019-0045184 | A | 5/2019 | |
| KR | 10-2019-0062176 | A | 6/2019 | |
| KR | 10-2020-0051498 | A | 5/2020 | |
| RU | 2425061 | C2 | 7/2011 | |
| WO | 2006/074694 | A1 | 7/2006 | |
| WO | 2014/077617 | A1 | 5/2014 | |
| WO | 2016/037960 | A1 | 3/2016 | |
| WO | 2016/167547 | A1 | 10/2016 | |
| WO | 2020/122562 | A1 | 6/2020 | |
| WO | 2020/171525 | A1 | 8/2020 | |

OTHER PUBLICATIONS

Machine translation of KF 2018-0067944 (no date).*
International Search Report (with translation) and Written Opinion dated Mar. 7, 2022, issued in corresponding International Patent Application No. PCT/KR2021/017788.
Alexakis et al., "Mild Protection and Deprotection of Alcohols as ter-Butyl Ethers in the Field of Pheromone Synthesis," Tetrahedron Letters, 1988, vol. 29, No. 24, pp. 2951-2954.
Extended European Search Report issued Mar. 20, 2024 for European Patent Application No. 21898727.9.
Office Action issued in corresponding Russian Patent Application No. 2023117105 dated Nov. 26, 2024.
Office Action issued in corresponding Chinese Patent Application No. 202180079265.3 dated Dec. 4, 2024.

* cited by examiner

*Primary Examiner* — Marc S Zimmer
(74) *Attorney, Agent, or Firm* — Morgan, Lewis & Bockius LLP

(57) ABSTRACT

Provided are a polyethylene which is improved in terms of total volatile organic compounds (TVOCs) generated by low molecular weight polymers, thereby being suitable for fiber production, and a method of preparing the same.

12 Claims, No Drawings

POLYETHYLENE AND PREPARATION METHOD THEREOF

TECHNICAL FIELD

Cross Citation with Related Application(s)

The present application is based on, and claims priority from, Korean Patent Application Nos. 10-2020-0165109 and 10-2021-0166074, filed on Nov. 30, 2020, and Nov. 26, 2021, respectively, the disclosures of which are hereby incorporated by reference herein in their entirety.

The present invention relates to a polyethylene having a reduced generation of total volatile organic compounds (TVOCs) which may be generated due to polymer distribution in a low molecular weight region, and being suitable for fiber production, and a method of preparing the same.

BACKGROUND

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that a molecular weight distribution of polymers is broad. Also, since compositional distribution of comonomers is not uniform, there is a problem in that it has a limitation in securing the desired physical properties.

In contrast, the metallocene catalyst consists of a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform composition distribution of comonomers, depending on the single site characteristics.

On the other hand, a polypropylene resin used as a non-woven material has excellent chemical resistance and tensile strength and has been mainly used as a surface material for hygiene products such as diapers, sanitary napkins, etc. However, a homopolypropylene resin has a disadvantage of giving a rough feel on the surface of nonwoven fabrics, because it generally has a low content of a low-molecular-weight copolymer and a low xylene solubility.

In order to improve the texture of the surface, a bicomponent fiber, in which a polypropylene resin was used for the interior and a polyethylene resin was used for the exterior, was produced by mixing the polypropylene resin with the polyethylene resin, and has been used as a material for a nonwoven fabric having improved texture and softness. In addition, to provide convenience for users by improving the texture and softness of the nonwoven fabric, thickness of spun yarns to be used has been decreased.

In particular, polyethylene prepared with Ziegler-Natta catalyst has high total volatile organic compounds (TVOCs) due to a polymer distribution in a low molecular weight region, making it difficult to use the polyethylene as a material closely related to life. In a high-temperature process for the production of final fibers or non-woven fabrics, harmful gases such as harmful fumes may be generated from TVOCs.

Accordingly, in the production of polyethylene used for the bicomponent fibers, it is more necessary to develop a polyethylene having a narrow molecular weight distribution to secure excellent tensile strength and softness and having a reduced generation of total volatile organic compounds (TVOCs) which may be increased due to polymer distribution in the low molecular weight region.

DETAILED DESCRIPTION OF THE INVENTION

Technical Problem

There is provided a polyethylene having a reduced generation of total volatile organic compounds (TVOCs) which may be generated due to polymer distribution in a low molecular weight region, thereby being suitable for fiber production.

There is also provided a method of preparing the above-described polyethylene for fiber production.

Technical Solution

According to one embodiment of the present invention, there is provided a polyethylene, wherein a melt index (ASTM D 1238, 190° C., 2.16 kg) is 15 g/10 min to 40 g/10 min, a melt flow rate ratio (MFRR, $MI_5/MI_{2.16}$) is 2.3 to 2.7, an integral value in the region where the Log Mw is 3.0 or less in a GPC curve, wherein the x-axis is log Mw and the y-axis is dw/dlogMw, is 0.8% to 1.8% of the total integral value, and the content of a linear hydrocarbon having 3 to 32 carbon atoms based on 1 g of the polyethylene is 600 ppm or less, when a peak area of the linear hydrocarbon having 3 to 32 carbon atoms is converted into a ratio with respect to a peak area of the polyethylene in a GC-FID graph obtained through gas chromatography/flame ionization detector analysis (GC-FID, Inlet, Detector temperature: 300° C., residence time: 20 minutes).

There is also provided a method of preparing the above-described polyethylene for fiber production.

Advantageous Effects

According to the present invention, it is possible to provide a polyethylene having a narrow molecular weight distribution due to a uniform reaction of ethylene and hydrogen in a reactor by increasing an input amount of hydrogen and having a minimal polymer distribution in a low molecular weight region according to GPC and GC-FID analysis and a reduced generation of TVOCs by optimizing a melt index ($MI_{2.16}$, ASTM D 1238, 190° C., 2.16 kg) and a melt flow rate ratio (MFRR, $MI_6/MI_{2.16}$).

Accordingly, the polyethylene according to the present invention may be usefully applied to production of fiber products such as sanitary materials including diapers and masks, medical and other general consumer goods.

DETAILED DESCRIPTION OF THE EMBODIMENTS

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

The terms "about", "substantially" or the like used throughout this specification have the meaning of proximity to the corresponding number when a specific allowable error for preparation or materials is defined, and are used in order to prevent any unscrupulous invader from unduly using the disclosure about an accurate or absolute number provided to help understanding of the present disclosure.

Further, "parts by weight", as used herein, refers to a relative concept of a ratio of the weight of the material based on the weight of a specific material. For example, in a mixture containing 50 g of material A, 20 g of material B, and 30 g of material C, the amounts of material B and material C based on 100 parts by weight of material A are 40 parts by weight and 60 parts by weight, respectively.

Further, "wt % (% by weight)" refers to an absolute concept of expressing the weight of a specific material in percentage based on the total weight. In the above-described mixture, the contents of material A, material B, and material C based on 100% of the total weight of the mixture are 50% by weight, 20% by weight, and 30% by weight, respectively. At this time, a sum of contents of each component does not exceed 100% by weight.

The present invention may be variously modified and have various forms, and specific exemplary embodiments will be described and explained in detail below. However, it is not intended to limit the present invention to the specific exemplary embodiments and it must be understood that the present invention includes every modifications, equivalents, or replacements included in the spirit and technical scope of the present invention.

Hereinafter, the present invention will be described in more detail.

According to one embodiment of the present invention, provided is a polyethylene having a narrow molecular weight distribution due to a uniform reaction of ethylene and hydrogen in a reactor by increasing an input amount of hydrogen and having a minimal polymer distribution in a low molecular weight region according to GPC and GC-FID analysis and a reduced generation of TVOCs by optimizing a melt index ($MI_{2.16}$, ASTM D 1238, 190° C., 2.16 kg) and a melt flow rate ratio (MFRR, $MI_6/MI_{2.16}$), thereby being suitable for fiber production.

Specifically, with regard to the polyethylene, a melt index (ASTM D 1238, 190° C., 2.16 kg) is 15 g/10 min to 40 g/10 min, a melt flow rate ratio (MFRR, $MI_6/MI_{2.16}$) is 2.3 to 2.7, an integral value in the region where the Log Mw is 3.0 or less in a GPC curve, wherein the x-axis is log Mw and the y-axis is dw/dlogMw, is 0.8% to 1.8% of the total integral value, and the content of a linear hydrocarbon having 3 to 32 carbon atoms based on 1 g of the polyethylene is 600 ppm or less, when a peak area of the linear hydrocarbon having 3 to 32 carbon atoms is converted into a ratio with respect to a peak area of the polyethylene in a GC-FID graph obtained through gas chromatography/flame ionization detector analysis (GC-FID, Inlet, Detector temperature: 300° C., residence time: 20 minutes).

In particular, when a specific metallocene catalyst as described below is used, the polyethylene may have a narrow molecular weight distribution due to a uniform reaction of ethylene and hydrogen in a reactor by increasing an input amount of hydrogen and may have a reduced generation of TVOCs.

Upon producing polyethylenes, which are used in bicomponent fibers, in which a polypropylene resin is used for the interior and a polyethylene resin is used for the exterior, it is necessary to develop a polyethylene having a reduction in total volatile organic compounds (TVOCs) generated due to polymer distribution in the low molecular weight region, together with a narrow molecular weight distribution in order to secure excellent tensile strength and softness.

Hereinafter, the polyethylene of the present invention will be described in more detail.

With regard to the polyethylene, a melt index (ASTM D 1238, 190° C., 2.16 kg) is g/10 min to 40 g/10 min.

Specifically, with regard to the polyethylene, the melt index (ASTM D 1238, 190° C., 2.16 kg) may be preferably 16 g/10 min or more, or 17 g/10 min or more, or 17.5 g/10 min or more, or 18 g/10 min or more, or 18.5 g/10 min or more, or 18.9 g/10 min or more, and 38 g/10 min or less, or 35 g/10 min or less, or 33 g/10 min or less, or 32 g/10 min or less, or g/10 min or less, or 29.8 g/10 min or less.

By having the melt index as above, the molecular weight and viscosity of the polyethylene may be optimized, and flowability and processability may be improved.

Further, with regard to the polyethylene, the melt flow rate ratio (MFRR, melt flow rate ratio, $MI_6/MI_{2.16}$) is preferably 2.3 to 2.7.

The MFRR is a value obtained by dividing a melt index ($MI_6$) measured for the polyethylene at 190° C. under a load of 5 kg by a melt index ($MI_{2.16}$) measured at 190° C. under a load of 2.16 kg according to ASTM D1238.

More specifically, the melt flow rate ratio (MFRR, $MI_6/MI_{2.16}$) of the polyethylene, as measured at 190° C. according to ASTM D1238, may be preferably 2.35 or more, or 2.4 or more, or 2.45 or more, or 2.50 or more, and 2.65 or less, or 2.6 or less, or 2.59 or less, or 2.56 or less, or 2.54 or less.

Since the polyethylene has the melt flow rate ratio as above, the molecular weight distribution of the polyethylene may be optimized, and flowability and processability may be improved.

Further, with regard to the polyethylene, an integral value in the region where the Log Mw is 3.0 or less in a GPC curve, wherein the x-axis is log Mw and the y-axis is dw/dlogMw, is 0.8% to 1.8% of the total integral value.

Specifically, with regard to the polyethylene, when the integral value in the region where the Log Mw is 3.0 or less in a GPC curve, wherein the x-axis is log Mw and the y-axis is dw/dlogMw, is more than 1.6% of the total integral value, problems such as harmful fume, die drool, and odor may be generated, which may reduce work stability and efficiency during processing. From this point of view, the integral value in the region where the Log Mw is 3.0 or less may be preferably 1.6% or less, or 1.5% or less, or 1.4% or less, or 1.3% or less, or 1.25% or less, or 1.23% or less. However, when the integral value in the region where the Log Mw is 3.0 or less is less than 0.8%, flowability may deteriorate during processing. From this point of view, the integral value in the region where the Log Mw is 3.0 or less may be preferably 0.85% or more, or 0.9% or more, or or more, or 0.95% or more, or 0.98% or more, or 1.0% or more, or 1.02% or more.

When the polyethylene has the above-described integral value in the region where the Log Mw is 3.0 or less, its molecular weight distribution may be optimized, flowability and processability may be improved, and it may be easy to secure optimum spinning conditions.

Meanwhile, the polyethylene according to one embodiment of the present invention may optimize the weight average molecular weight and the molecular weight distribution, may minimize occurrence of single yarns in a spinning process during production of low denier (thin) fibers, and may improve processability (filterability) and a process yield by lowering a processing load of a mesh filter.

Specifically, the polyethylene may have a molecular weight distribution (Mw/Mn) of 2.0 to 2.6, preferably 2.1 or more, or 2.2 or more, or 2.25 or more, or 2.3 or more, or 2.32 or more, or 2.35 or more, and 2.55 or less, or 2.52 or less, or 2.50 or less, or 2.48 or less, or 2.45 or less, or 2.42 or less, or 2.39 or less.

Further, the polyethylene may have a weight average molecular weight of 38000 g/mol to 65000 g/mol, preferably 38500 g/mol or more, or 39000 g/mol or more, or 39500 g/mol or more, or 40000 g/mol or more, or 42000 g/mol or more, and 63000 g/mol or less, or 60000 g/mol or less, or 58000 g/mol or less, or 55000 g/mol or less, or 50000 g/mol or less, or 49000 g/mol or less.

In the present invention, since the polyethylene has a narrow molecular weight distribution while optimizing the melt index and weight average molecular weight as described above, it may have excellent mechanical properties and may minimize polymer distribution in the low molecular weight region.

As used herein, the number average molecular weight (Mn), the weight average molecular weight (Mw), and the molecular weight distribution are values converted with respect to polystyrene standards, as measured using gel permeation chromatography (GPC). However, the weight average molecular weight is not limited thereto, and may be measured by another method known in the art to which the present invention pertains.

For example, samples of the polyethylene were evaluated using PL-GPC220 instrument manufactured by Waters and a Polymer Laboratories PLgel MIX-B 300 mm length column. The evaluation temperature was 160° C., and 1,2,4-trichlorobenzene was used as a solvent, and a flow rate was 1 mL/min. Each sample was prepared at a concentration of 10 mg/10 mL, and fed in an amount of 200 μL. A calibration curve formed using polystyrene standards was used to measure Mw and Mn values. 9 kinds of polystyrene standard specimens having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

Meanwhile, the polyethylene is characterized by having a narrow molecular weight distribution while optimizing the melt index and weight average molecular weight as described above, and having a minimal polymer distribution in the low molecular weight region, together with excellent mechanical properties.

The polymer distribution in the low molecular weight region of the polyethylene may be confirmed by measuring the content of linear hydrocarbon having 3 to 32 carbon atoms, or 5 to 32 carbon atoms, or 6 to 32 carbon atoms, or 8 to 32 carbon atoms, or 10 to 32 carbon atoms, or 12 to 32 carbon atoms, or 14 to 32 carbon atoms by gas chromatography/flame ionization detector analysis (GC-FID, Inlet, Detector temperature: 300° C., residence time: 20 minutes). For example, it may be confirmed by a value obtained by correcting the GC/FID peak area corresponding to the linear hydrocarbon having 3 to 32 carbon atoms with the weight of the polyethylene sample.

Specifically, with regard to the polyethylene, the content of the linear hydrocarbon having 3 to 32 carbon atoms is 600 ppm or less or 80 ppm to 600 ppm, as measured by gas chromatography/flame ionization detector analysis (GC-FID, Inlet, Detector temperature of 300° C., residence time of 20 minutes).

The polyethylene is characterized by having a narrow molecular weight distribution while optimizing the melt index and weight average molecular weight as described above, and having a minimal polymer distribution in the low molecular weight region, together with excellent mechanical properties.

As used herein, the gas chromatography/flame ionization detector (GC-FID) analysis refers to an instrument or method for separating the contents of solutions for various samples. In GC/FID, gas chromatography (GC) used for separating various compounds is connected to a flame ionization detector (FID) for measuring atomic mass of a material entering from GC. A relative comparison of the contents of compounds may be performed by calculating an area ratio of GC/FID.

Specifically, with regard to the polyethylene, the content of the linear hydrocarbon having 3 to 32 carbon atoms may be preferably 580 ppm or less, or 570 ppm or less, or 560 ppm or less, or 550 ppm or less, or 548 ppm or less, as measured by gas chromatography/flame ionization detector analysis (GC-FID, Inlet, Detector temperature of 300° C., residence time of 20 minutes). However, considering the substantial molecular structure and molecular weight distribution of the polyethylene, the content of the linear hydrocarbon having 3 to 32 carbon atoms may be 100 ppm or more, or 200 ppm or more, or 300 ppm or more, or 350 ppm or more, or 400 ppm or more, or 450 ppm or more, or 500 ppm or more, or 521 ppm or more, as measured by gas chromatography/flame ionization detector analysis (GC-FID, Inlet, Detector temperature of 300° C., residence time of 20 minutes).

With regard to the polyethylene, the content of the linear hydrocarbon having 3 to 32 carbon atoms is a value (ppm) based on 1 g of the polyethylene, when a peak area of the linear hydrocarbon having 3 to 32 carbon atoms is converted into a ratio with respect to a peak area of the polyethylene in a GC-FID graph obtained through gas chromatography/flame ionization detector analysis (GC-FID, Inlet, Detector temperature: 300° C., residence time: 20 minutes).

Specifically, about 50 mg of a sample prepared using the polyethylene is weighed, and subjected to gas chromatography/flame ionization detector analysis (GC-FID) under the following conditions.

[GC/FID Analysis Conditions]

GC instrument: 7890A GC system manufactured by Agilent

GC oven: 100° C. (5 min)-15° C./min-320° C. (20 min)

Inlet, Detector temperature: 300° C.

For example, 7890A GC system manufactured by Agilent may be used as the GC instrument, and analysis may be performed under the following GC oven conditions: the oven is maintained at 100° C. for 5 minutes, and heated at a rate of 15° C. per minute, and then maintained at 320° C. for 20 minutes. At this time, the measurement may be performed at the inlet temperature and detector temperature of 300° C. in the instrument.

Specifically, the gas chromatography/flame ionization detector (GC-FID) analysis may perform the following pretreatment process of the polyethylene in order to measure the content of the linear hydrocarbon having 3 to 32 carbon atoms in the polyethylene. For example, the pretreatment process may be performed as follows: 0.5 g of the polyethylene sample is dissolved in 10 mL of xylene, the resin component is precipitated by adding 10 mL of ethanol, followed by centrifuging. The supernatant is dried with nitrogen ($N_2$) gas to remove the solvent, the product is dissolved in trichloromethane ($CHCl_3$) or in a mixed solvent ($CHCl_3$/acetone) of trichloromethane and acetone, and the solution is injected into the measuring instrument.

In the graph obtained through GC-FID analysis performed under the above-described conditions, the peak area of the linear hydrocarbon having 3 to 32 carbon atoms is converted into a ratio with respect to a peak area of the polyethylene, and the content (ppm) of the linear hydrocarbon having 3 to 32 carbon atoms based on 1 g of the polyethylene is determined.

During this analysis, a relative comparison of the polymer distribution in the low molecular weight region may be calculated by an area ratio of GC/FID. To confirm the component of each peak, GC/MS analysis may be first performed. This GC/MS analysis may be performed with reference to a method described in the following Experimental Example.

Meanwhile, the polyethylene may be a high-density polyethylene (HDPE) satisfying a density (ASTM D1505, 23° C.) of 0.945 g/cm$^3$ to 0.965 g/cm$^3$.

More specifically, the density of the polyethylene may be preferably 0.946 g/cm$^3$ or more, or 0.947 g/cm$^3$ or more, or 0.948 g/cm$^3$ or more, or 0.950 g/cm$^3$ or more, or 0.951 g/cm$^3$ or more, and 0.963 g/cm$^3$ or less, or 0.960 g/cm$^3$ or less, or 0.958 g/cm$^3$ or less, or 0.956 g/cm$^3$ or less, or 0.954 g/cm$^3$ or less.

The polyethylene according to one embodiment of the present invention may be a homopolymer of ethylene or a copolymer of a 04-20 alpha-olefin monomer and ethylene.

For example, the alpha-olefin may include alpha-olefin having 4 to 20 carbon atoms, or 4 to 15 carbon atoms, or 4 to 12 carbon atoms, specifically, one or more selected from the group consisting of 1-butene, 1-pentene, 1-hexene, 4-methyl-1-pentene, 1-octene, 1-decene, 1-dodecene, 1-tetradecene, 1-hexadecene, 1-octadecene, and 1-eicosene, or a mixture of two or more thereof, preferably, 1-butene or 1-hexene.

More specifically, the polyethylene according to one embodiment of the present invention may be a copolymer of ethylene and 1-butene.

Specifically, the alpha-olefin-derived repeating unit may be included in an amount of about 5 mol % or less, or about 0 mol % to about 5 mol % in the polyethylene. When the alpha-olefin-derived repeating unit is included in the above-described range, the polyethylene may exhibit superior processability. Preferably, the alpha-olefin-derived repeating unit may be included in an amount of about 4.8 mol % or less, or 4.5 mol % or less, or 4.2 mol % or less, or 4 mol % or less, or 3.8 mol % or less, or 3.5 mol % or less, based on the total weight of the polyethylene. However, considering the effect of improving processability according to control of the content of the alpha-olefin-derived repeating unit, the alpha-olefin-derived repeating unit may be more preferably included in an amount of about 0.2 mol % or more, about 0.5 mol % or more, or 1 mol % or more, or 1.2 mol % or more, or 1.5 mol % or more, or 1.8 mol % or more, or 2 mol % or more, based on the total weight of the polyethylene.

The polyethylene satisfying the above physical properties of the present invention has a narrow molecular weight distribution due to a uniform reaction of ethylene and hydrogen in a reactor by increasing an input amount of hydrogen and having the minimal polymer distribution in the low molecular weight region according to GPC and GC-FID analysis and a reduced generation of total volatile organic compounds (TVOCs) by optimizing the melt index ($MI_{2.16}$, ASTM D 1238, 190° C., 2.16 kg) and the melt flow rate ratio (MFRR, $MI_6/MI_{2.16}$), thereby being very preferably used for the production of bicomponent fibers or nonwoven fabrics.

As used herein, the term ⌈volatile organic compound (VOC)⌋ may be defined as all organic compounds present in the gaseous phase in the atmosphere, and is a term used to collectively denote all organic materials that may be present in the gaseous phase at room temperature and atmospheric pressure, such as hydrocarbons composed only of carbon and hydrogen, halogenated hydrocarbons, hydrocarbons containing nitrogen or sulfur, etc. In a broad sense, semi-volatile organic compounds may also be included. In the present specification, the volatile organic compound may be, for example, an organic solvent, a thermal decomposition by-product of a curing agent, or a by-product generated by an addition reaction.

In the present specification, gas chromatography/mass spectrometry (GC/MS) denotes a device or method for separating contents of solutions for various samples. In GC/MS, gas chromatography (GC) used for separating various compounds is connected to a mass spectrometer (MS) for measuring atomic mass of a material entering from GC. Residence time and mass vary depending on types of compounds. Since GC/MS is connected to a computer storing a library of a specific form of compounds, types of the compounds as well as a concentration thereof are identified through comparison with the library in which compounds in a solution may be determined. A successive investigation after determining the presence of the compounds is usually performed to analyze a specific material through GC.

In particular, with regard to the polyethylene of the present invention, the emission amount of total volatile organic compounds (TVOCs) is 150 ug/g or less or 10 ug/g to 150 ug/g.

Specifically, with regard to the polyethylene of the present invention, the emission amount of total volatile organic compounds (TVOCs) may be preferably 150 ug/g or less, or 150 ug/g or less, or 150 ug/g or less, or 150 ug/g or less. However, considering the substantial molecular structure and molecular weight distribution of the polyethylene, the emission amount of total volatile organic compounds (TVOCs) may be 15 ug/g or more, or 30 ug/g or more, or 40 ug/g or more, or 50 ug/g or more, or 70 ug/g or more, or 90 ug/g ppm or more.

For example, the emission amount of total volatile organic compounds (TVOCs) is determined by exposing a sample dissolved in a toluene standard solution to a high temperature, analyzing the sample by GC/MS, etc., and summing the values of individual VOCs generated from the test sample.

Specifically, the emission amount of total volatile organic compounds (TVOCs) from the polyethylene may be determined by performing gas chromatography/mass spectrometry-thermal desorption (GC/MS-TD) after exposing to a high temperature under the following conditions.

[GC/MS-TD Analysis Conditions]

Sample: 20 mg

Temperature and Time: 200° C. 10 min

GC oven: 50° C. (5 min)-10° C./min-300° C. (10 min)

Column: HP-5MS

Toluene standard solution

The emission amount (ug/g) of total volatile organic compounds (TVOCs) was calculated, as shown in Equation 1 below.

$$VOC_{compound}=[(A_{compound}/A_{std})\times C_{std}]/W_{sample} \quad \text{[Equation 1]}$$

$VOC_{compound}$: VOC value (ug/g) of an individual material generated from a test sample $A_{compound}$: chromatogram area of a peak of the individual material generated from the test sample $A_{std}$: a peak area of a toluene standard solution $C_{std}$: a weight (ug) of toluene injected using the toluene standard solution $W_{sample}$: a weight (g) of the test sample Specifically, with regard to the toluene standard solution, toluene may be used alone, or may be used at a concentration of about 0.1 ug/uL or more, or about 0.2 ug/uL or more, or about 0.5 ug/uL or more, or about 0.7 ug/uL or more, or about 0.8 ug/uL or more, or about 1.0 ug/uL or more, or about 1.2 ug/uL or more, and about 3.5 ug/uL or less, or about 3.0 ug/uL or less, or about 2.8 ug/uL or less, or about 2.5 ug/uL or less, or about 2.2 ug/uL or less, or about 2.0 ug/uL or less, or about 1.9 ug/uL or less, or about 1.7 ug/uL or less, or about 1.5 ug/uL or less, or about 1.4 ug/uL or less in a solvent such as methanol, etc.

The results of the gas chromatography/mass spectrometry-thermal desorption (GC/MS-TD) analysis are obtained as a value (ug/g) calculated from the peak area versus the peak area of the toluene standard solution.

Meanwhile, according to another embodiment of the present invention, provided is a method of preparing the above-described polyethylene.

Specifically, the polyethylene is prepared by a method of polymerizing ethylene in the presence of a catalyst composition including a metallocene compound represented by the following Chemical Formula 1:

[Chemical Formula 1]

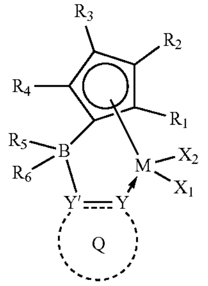

in Chemical Formula 1,

B is boron,

M is a Group 4 transition metal, $R_1$ to $R_4$ are each independently hydrogen, $C_{1-20}$ alkyl, $C_{3-20}$ cycloalkyl, or $C_{6-20}$ aryl, or $R_1$ and $R_2$ or $R_3$ and $R_4$ are connected to each other to form a substituted or unsubstituted $C_{6-60}$ aromatic ring, $R_5$ and $R_6$ are each independently $C_{1-20}$ alkyl, $C_{3-20}$ cycloalkyl, or $C_{6-20}$ aryl, or $R_5$ and $R_6$ are connected to each other to form a $C_{3-60}$ aliphatic ring or a $C_{6-60}$ aromatic ring, $X_1$ and $X_2$ are each independently $C_{1-20}$ alkyl or —O(CO)R', wherein R' is $C_{1-20}$ alkyl, Q is a substituted or unsubstituted $C_{2-60}$ hetero ring including any one or more selected from the group consisting of N, O, and S, Y and Y' are elements constituting Q, Y is N, O, or S, and Y' is an element of Q, and is adjacent to Y, and is N or C.

The above substituents are more specifically explained as follows.

In the specification, the following terms may be defined as follows unless specifically limited.

A hydrocarbyl group is a monovalent functional group in which a hydrogen atom is removed from hydrocarbon, and it may include an alkyl group, an alkenyl group, an alkynyl group, an aryl group, an aralkyl group, an aralkenyl group, an aralkynyl group, an alkylaryl group, an alkenylaryl group, an alkynylaryl group, etc. Further, a $C_{1-30}$ hydrocarbyl group may be a $C_{1-20}$ or $C_{1-10}$ hydrocarbyl group. For example, the hydrocarbyl group may be a linear, branched, or cyclic alkyl group. More specifically, the $C_{1-30}$ hydrocarbyl group may be a linear, branched or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as a phenyl group, a biphenyl group, a naphthyl group, an anthracenyl group, a phenanthrenyl group, or a fluorenyl group. In addition, it may be an alkylaryl group such as a methylphenyl group, an ethylphenyl group, a methylbiphenyl group, a methylnaphthyl group, etc., and may be an arylalkyl group such as a phenylmethyl group, a phenylethyl group, a biphenylmethyl group, a naphthylmethyl group, etc. In addition, it may be an alkenyl such as allyl, ethenyl, propenyl, butenyl, pentenyl, etc.

A hydrocarbyloxy group is a functional group in which a hydrocarbyl group is bound to oxygen. Specifically, a $C_{1-30}$ hydrocarbyloxy group may be a $C_{1-20}$ or $C_{1-10}$ hydrocarbyloxy group. For example, the hydrocarbyloxy group may be a linear, branched, or cyclic alkyl group. More specifically, the $C_{1-30}$ hydrocarbyloxy group may be a linear, branched, or cyclic alkoxy group such as a methoxy group, an ethoxy group, an n-propoxy group, an iso-propoxy group, an n-butoxy group, an iso-butoxy group, a tert-butoxy group, an n-pentoxy group, an n-hexoxy group an n-heptoxy group, a cyclohexoxy group, etc.; or an aryloxy group such as a phenoxy group, a naphthaleneoxy group, etc.

A hydrocarbyloxyhydrocarbyl group is a functional group in which one or more hydrogen atoms of a hydrocarbyl group are substituted with one or more hydrocarbyloxy groups. Specifically, a $C_{2-30}$ hydrocarbyloxyhydrocarbyl group may be a $C_{2-20}$ or $C_{2-15}$ hydrocarbyloxyhydrocarbyl group. For example, the hydrocarbyloxyhydrocarbyl group may be a linear, branched, or cyclic alkyl group. More specifically, a $C_{2-30}$ hydrocarbyloxyhydrocarbyl group may be an alkoxyalkyl group such as a methoxymethyl group, a methoxyethyl group, an ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, etc.; or an aryloxyalkyl group such as a phenoxyhexyl group, etc.

A hydrocarbyl(oxy)silyl group is a functional group in which 1 to 3 hydrogen atoms of —$SiH_3$ are substituted with 1 to 3 hydrocarbyl groups or hydrocarbyloxy groups. Specifically, a $C_{1-30}$ hydrocarbyl(oxy)silyl group may be a $C_{1-20}$, $C_{1-15}$, $C_{1-10}$, or $C_{1-5}$ hydrocarbyl(oxy)silyl group. More specifically, the $C_{1-30}$ hydrocarbyl(oxy)silyl group may be an alkylsilyl group such as a methylsilyl group, a dimethylsilyl group, a trimethylsilyl group, a dimethylethylsilyl group, a diethylmethylsilyl group, a dimethylpropylsilyl group, etc.; an alkoxysilyl group such as a methoxysilyl group, a dimethoxysilyl group, a trimethoxysilyl group, a dimethoxyethoxysilyl group, etc.; or an alkoxyalkylsilyl group such as a methoxydimethylsilyl group, a diethoxymethylsilyl group, a dimethoxypropylsilyl group, etc.

Further, a $C_{1-20}$ silylhydrocarbyl group is a functional group in which one or more hydrogen atoms of a hydrocarbyl group are substituted with a silyl group. Specifically, the silyl group may be $—SiH_3$ or a hydrocarbyl(oxy)silyl group. Specifically, the $C_{1-20}$ silylhydrocarbyl group may be a $C_{1-15}$ or $C_{1-10}$ silylhydrocarbyl group. More specifically, the $C_{1-20}$ silylhydrocarbyl group may be a silylalkyl group such as $—CH_2—SiH_3$, etc.; an alkylsilylalkyl group such as a methylsilylmethyl group, a methylsilylethyl group, a dimethylsilylmethyl group, a trimethylsilylmethyl group, a dimethylethylsilylmethyl group, a diethylmethylsilylmethyl group, a dimethylpropylsilylmethyl group, etc.; or an alkoxysilylalkyl group such as dimethylethoxysilylpropyl group, etc.

The halogen may be fluorine (F), chlorine (Cl), bromine (Br), or iodine (I).

The alkyl may be linear or branched alkyl. Specifically, the $C_{1-20}$ alkyl may be $C_{1-20}$ linear alkyl; $C_{1-10}$ linear alkyl; $C_{1-5}$ linear alkyl; $C_{3-20}$ branched alkyl; $C_{3-15}$ branched alkyl; or $C_{3-10}$ branched alkyl. More specifically, the $C_{1-20}$ alkyl may be a methyl group, an ethyl group, an n-propyl group, an iso-propyl group, an n-butyl group, an iso-butyl group, a tert-butyl group, an n-pentyl group, an iso-pentyl group, etc., but is not limited thereto. Meanwhile, in the present specification, "iPr" means an iso-propyl group.

The cycloalkyl may be cyclic alkyl. Specifically, the $C_{3-20}$ cycloalkyl may be $C_{3-20}$ cyclic alkyl; $C_{3-15}$ cyclic alkyl; or $C_{3-10}$ cyclic alkyl. More specifically, the cycloalkyl may be cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, etc., but is not limited thereto. Meanwhile, in the present specification, "Cy" means cycloalkyl having 3 to 6 carbon atoms.

The alkenyl may be linear, branched, or cyclic alkenyl. Specifically, the $C_{2-20}$ alkenyl may be $C_{2-20}$ linear alkenyl, $C_{2-10}$ linear alkenyl, $C_{2-5}$ linear alkenyl, $C_{3-20}$ branched alkenyl, $C_{3-15}$ branched alkenyl, $C_{3-10}$ branched alkenyl, $C_{5-20}$ cyclic alkenyl, or $C_{5-10}$ cyclic alkenyl. More specifically, the $C_{2-20}$ alkenyl may be ethenyl, a propenyl, a butenyl, a pentenyl, or a cyclohexenyl, etc.

The alkoxy may be linear, branched, or cyclic alkoxy. Specifically, the $C_{1-20}$ alkoxy may be $C_{1-20}$ linear alkoxy; $C_{1-10}$ linear alkoxy; $C_{1-5}$ linear alkoxy; $C_{3-20}$ branched or cyclic alkoxy; $C_{3-15}$ branched or cyclic alkoxy; or $C_{3-10}$ branched or cyclic alkoxy. More specifically, the $C_{1-20}$ alkoxy may be methoxy, ethoxy, n-propoxy, iso-propoxy, n-butoxy, iso-butoxy, tert-butoxy, n-pentoxy, iso-pentoxy, neo-pentoxy, or cycloheptoxy, etc., but is not limited thereto.

The alkoxyalkyl has a structure including $—R_a—O—R_b$, and may be a substituent in which one or more hydrogens of alkyl($—R_a$) are substituted with alkoxy($—O—R_b$). Specifically, the $C_{2-20}$ alkoxyalkyl may be methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, etc., but is not limited thereto.

The aryl includes monocyclic, bicyclic, or tricyclic aromatic hydrocarbons. According to one embodiment of the present invention, the aryl may have 6 to 60 carbon atoms or 6 to 20 carbon atoms, and the aryl may be specifically phenyl, naphthyl, anthracenyl, dimethylanilinyl, anisolyl, etc., but is not limited thereto.

The heteroaryl is heteroaryl including one or more of N, O, and S as a heteroatom, and the number of carbon atoms may be, but is not particularly limited to, 2 to 60 or 2 to 20. Examples of the heteroaryl may include xanthene, thioxanthen, thiophene, furan, pyrrole, imidazole, thiazole, oxazole, oxadiazole, triazole, pyridyl, bipyridyl, pyridinyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, etc., but are not limited thereto.

The hydrocarbyl group means a monovalent hydrocarbon compound, and includes an alkyl group, an alkenyl group, an alkynyl group, an aryl group, an aralkyl group, an aralkenyl group, an aralkynyl group, an alkylaryl group, an alkenylaryl group, an alkynylaryl group, etc. For example, the hydrocarbyl group may be linear, branched, or cyclic alkyl. More specifically, the hydrocarbyl group having 1 to 30 carbon atoms may be a linear, branched, or cyclic alkyl group such as a methyl group, an ethyl group, an n-propyl group, an iso-propyl group, an n-butyl group, an iso-butyl group, a tert-butyl group, an n-pentyl group, an n-hexyl group, an n-heptyl group, a cyclohexyl group, etc.; or an aryl group such as phenyl, biphenyl, naphthyl, anthracenyl, phenanthrenyl, fluorenyl, etc. Moreover, it may be alkylaryl such as methylphenyl, ethylphenyl, methylbiphenyl, methylnaphthyl, etc., or arylalkyl such as phenylmethyl, phenylethyl, biphenylmethyl, naphthylmethyl, etc. It may also be alkenyl such as allyl, ethenyl, propenyl, butenyl, pentenyl, etc.

The hetero ring includes all of aliphatic rings including any one or more selected from the group consisting of N, O, and S, and aromatic rings including any one or more selected from the group consisting of N, O, and S.

Further, the Group 4 transition metal may be titanium (Ti), zirconium (Zr), hafnium (Hf), or rutherfordium (Rf), specifically, titanium (Ti), zirconium (Zr), or hafnium (Hf), and more specifically, zirconium (Zr) or hafnium (Hf), but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; amino; silyl; alkylsilyl or alkoxysilyl; phosphine; phosphide; sulfonate; and sulfone.

As the metallocene catalyst for ethylene polymerization of the present invention, a catalyst precursor including one or more metallocene compounds represented by Chemical Formula 1 may be used.

The metallocene compound represented by Chemical Formula 1 employs a bridge structure including a boron anion, unlike a constrained geometry catalyst (CGC)-type precursor commonly used. The traditional CGC-type precursor has a neutral bridge structure including silicon so that the ligand unit is negatively charged. Due to a structural limitation caused thereby, there is a problem in that it is difficult to achieve various physical properties during preparation of olefin polymers.

In contrast, the metallocene compound represented by Chemical Formula 1 according to the present invention may have a neutral ligand unit because the bridge structure is negatively charged. The ligand unit of the present invention is the hetero ring Q of Chemical Formula 1, wherein Y as an element of Q coordinates with a metal, and Y', as an element of Q, adjacent to Y is connected to the bridge. Accordingly, in the present invention, by employing various neutral ligand units satisfying the above structure, it is possible to prepare a catalyst having higher activity and higher copolymerizability than the existing CGC precursors.

In addition, alkyl or carboxylate is included as a metal substituent of the metallocene compound represented by Chemical Formula 1, which acts as a good leaving group to promote a reaction with a cocatalyst such as MAO, etc., resulting in improvement of activity.

Therefore, when the metallocene compound is used, the high melt index of polyethylene may be maintained, the low-molecular-weight component may be reduced, the molecular weight distribution may be narrow, and the SCB content may be increased to increase the effective number of physical cross-links of molecules, thereby preparing a polyethylene having a reduced generation of total volatile organic compounds (TVOCs).

Specifically, in Chemical Formula 1, M may be zirconium (Zr).

Further, in Chemical Formula 1, $R_1$ to $R_4$ are each independently hydrogen, $C_{1-10}$ alkyl or $C_{6-20}$ aryl, and $R_1$ and $R_2$ or $R_3$ and $R_4$ are connected to each other to form a substituted or unsubstituted $C_{6-20}$ aromatic ring. Preferably, $R_1$ to $R_4$ are each independently hydrogen, or methyl, or $R_1$ and $R_2$ or $R_3$ and $R_4$ are connected to each other to form a benzene ring or a 1,2,3,4-tetrahydronaphthalene ring, wherein the benzene ring or the 1,2,3,4-tetrahydronaphthalene ring may be unsubstituted or substituted with one substituent to four substituents selected from the group consisting of methyl, tert-butyl, and 4-tert-butyl phenyl.

Further, in Chemical Formula 1, $R_5$ and $R_6$ are each independently $C_{1-10}$ alkyl, or $C_{6-20}$ aryl, or $R_5$ and $R_6$ are connected to each other to form a $C_{3-20}$ aliphatic ring or a $C_{6-20}$ aromatic ring. Preferably, $R_5$ and $R_6$ are each independently methyl or phenyl, or $R_5$ and $R_6$ are connected to each other to form a cyclooctane ring.

More preferably, $R_5$ and $R_6$ may be each phenyl.

Further, in Chemical Formula 1, $X_1$ and $X_2$ may be each independently methyl or acetate.

Further, in Chemical Formula 1, R' may be methyl.

Further, in Chemical Formula 1, $X_1$ and $X_2$ may be the same as each other.

Further, in Chemical Formula 1, Q may be a substituted or unsubstituted $C_{2-20}$ hetero ring including any one or more selected from the group consisting of N, O, and S.

Preferably, Q may be a pyridine ring, a quinoline ring, a 4,5-dihydrooxazole ring, a pyrazole ring, or a benzoxazole ring, wherein Q is unsubstituted or substituted with one substituent to four substituents selected from the group consisting of methyl, isopropyl, and diphenylamino.

More preferably, Q may be a pyridine ring, a 4,5-dihydrooxazole ring, a pyrazole ring, or a benzoxazole ring, wherein Q is unsubstituted or substituted with one substituent to four substituents selected from the group consisting of methyl, isopropyl, and diphenylamino.

Further, in Chemical Formula 1, Y is a hetero atom coordinating with the metal M, and preferably, Y may be N.

Meanwhile, specific examples of the second metallocene compound represented by Chemical Formula 1 may include compounds represented by the following structural formulae, but the present invention is not limited thereto:

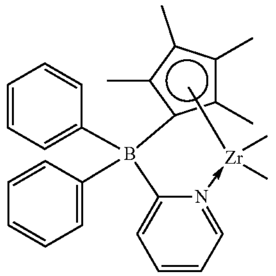

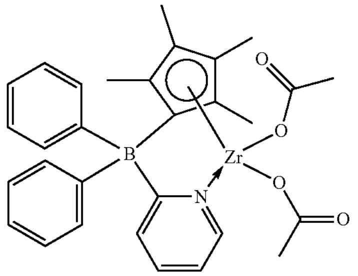

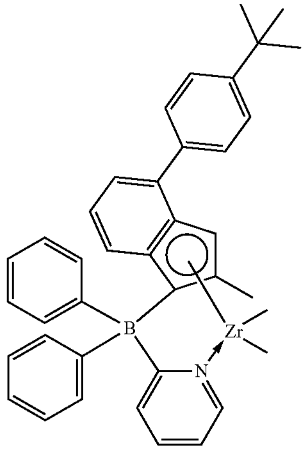

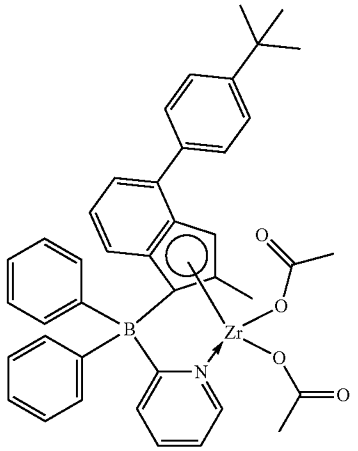

-continued
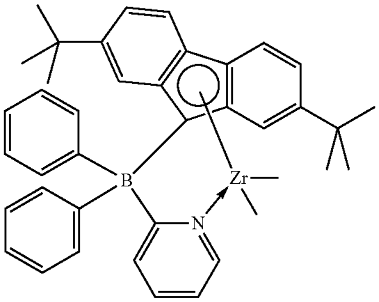
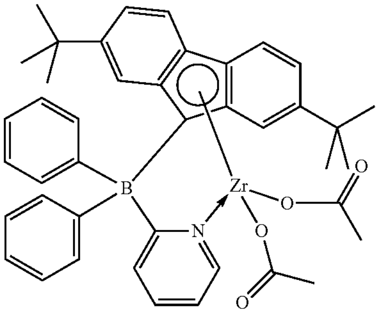
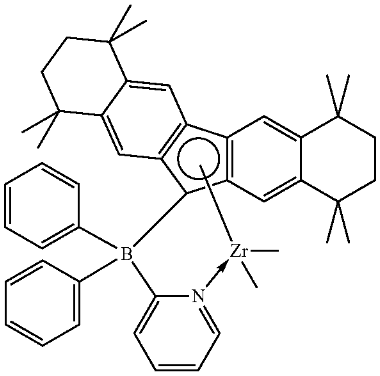
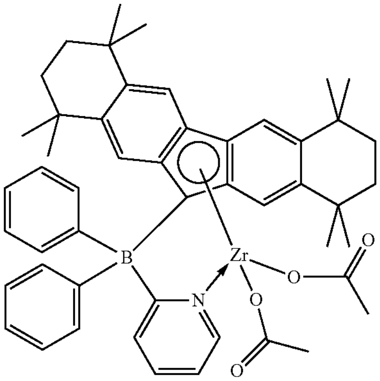
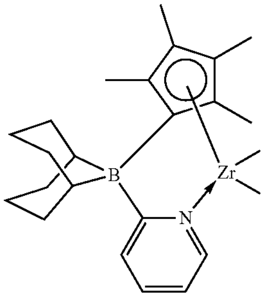
-continued
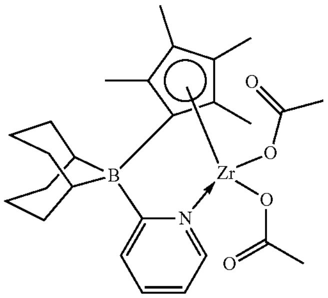
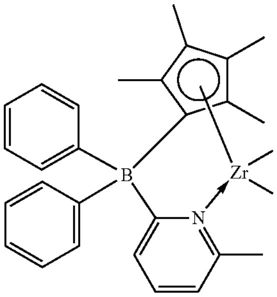
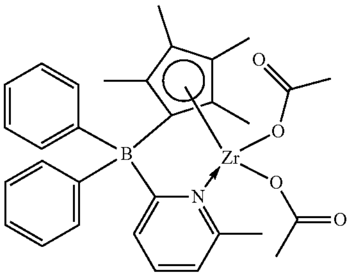
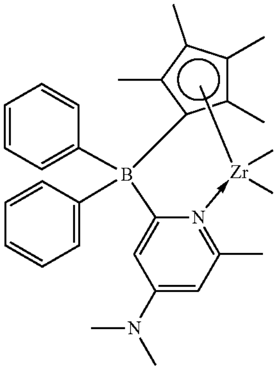
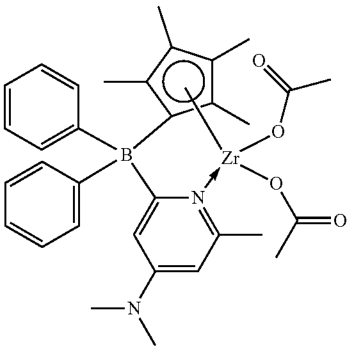

-continued
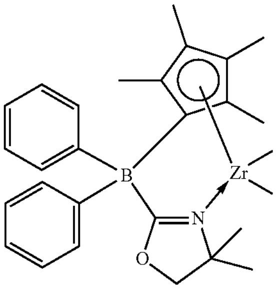
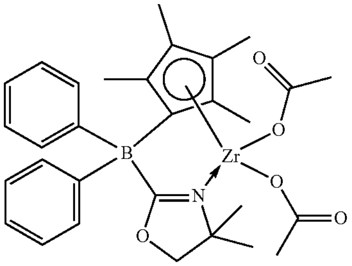
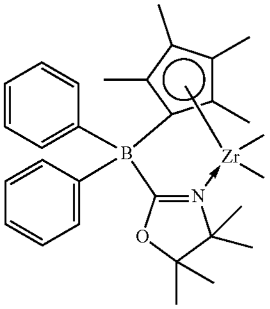
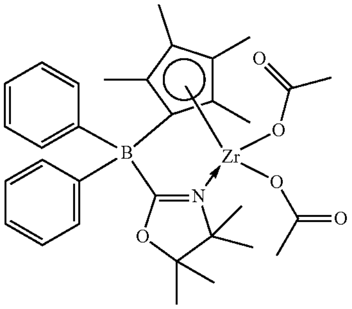
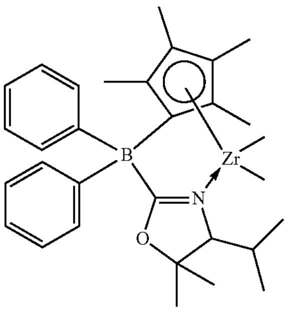
-continued
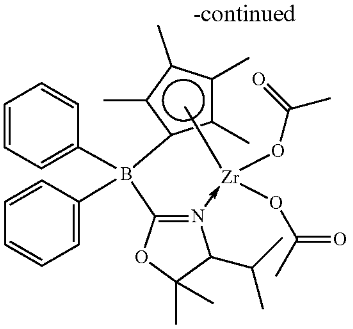
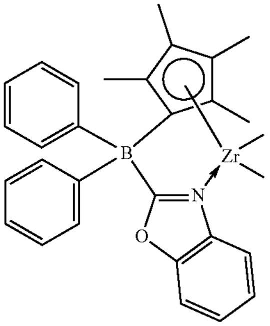
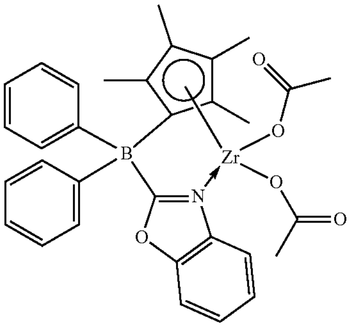
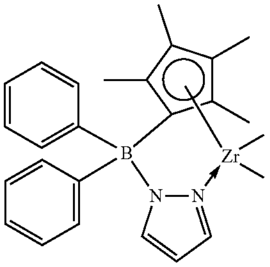
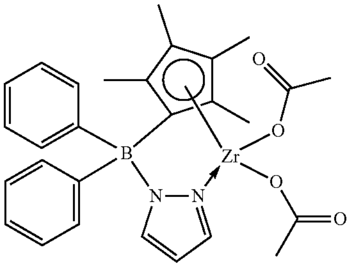
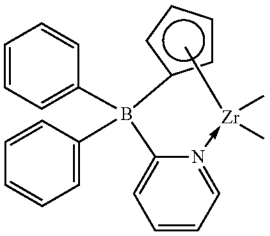

-continued

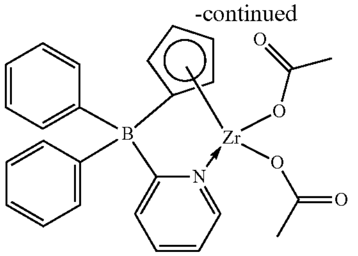

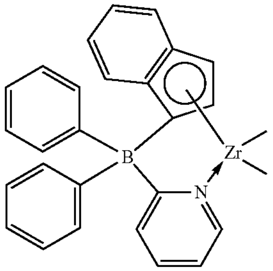

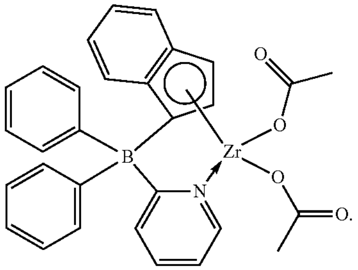

The metallocene compound represented by Chemical Formula 1 may be prepared by a preparation method, for example, as in the following Reaction Scheme 1, when $X_1$ and $X_2$ are the same as each other, but is not limited thereto, and it may be prepared according to known methods of preparing an organic compound and a metallocene compound. The preparation method will be more embodied in Preparation Example to be described later.

[Reaction Scheme 1]

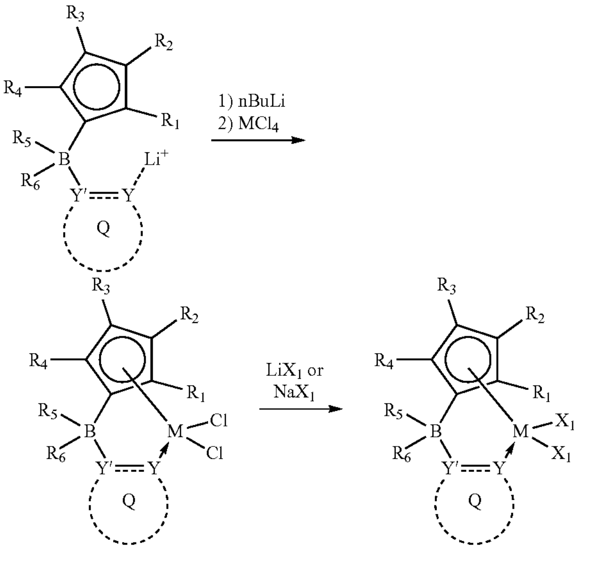

In Reaction Scheme 1, B, M, $R_1$ to $R_6$, $X_1$, $X_2$, Q, Y and Y' are the same as defined in Chemical Formula 1.

Meanwhile, in the present specification, equivalent (eq.) means molar equivalent.

The catalyst composition according to one embodiment of the present invention may include the metallocene compound of Chemical Formula 1 as a single catalyst.

In this regard, the catalyst composition may include the metallocene compound as a single component, or may be in the form of a supported metallocene catalyst including the metallocene compound and a support. When the supported metallocene catalyst is used, it is possible to improve morphology and physical properties of the polyethylene to be prepared, and it may be appropriately used in the traditional slurry polymerization, bulk polymerization, and gas phase polymerization processes.

Specifically, as the support, a support having a highly reactive hydroxyl group, silanol group, or siloxane group on the surface thereof may be used. To this end, those surface-modified by calcination, or those in which moisture is removed from the surface thereof by drying may be used. For example, silica prepared by calcination of silica gel, silica dried at a high temperature, silica-alumina, and silica-magnesia may be used.

These may commonly include oxides, carbonates, sulfates, and nitrates, such as $Na_2O$, $K_2CO_3$, $BaSO_4$, and $Mg(NO_3)_2$, etc.

The support may be calcined or dried at a temperature of about 200° C. to 600° C. or about 250° C. to 600° C. When the calcination or drying temperature for the support is low, too much moisture remains in the support, and thus it is apprehended that the moisture on the surface may react with the cocatalyst. In addition, a cocatalyst supporting ratio may be relatively high due to excess hydroxyl groups, but this requires a large amount of the cocatalyst. When the drying or calcination temperature is too high, pores on the surface of the support may be combined with each other to reduce surface area, and many hydroxyl groups or silanol groups may be lost from the surface, leaving only siloxane groups. Thus, it is apprehended that reactive sites with the cocatalyst may be reduced.

The amount of the hydroxyl groups on the support surface is preferably 0.1 mmol/g to 10 mmol/g, and more preferably 0.5 mmol/g to 5 mmol/g. The amount of the hydroxyl groups on the support surface may be controlled by a preparation method of the support and preparation conditions, or drying conditions, for example, temperature, time, vacuum or spray drying, etc.

When the amount of hydroxyl groups is less than 0.1 mmol/g, reactive sites with the cocatalyst may be reduced. When the amount of hydroxyl groups is more than 10 mmol/g, it may be caused by moisture besides the hydroxyl groups present on the surface of support particles, which is not desirable.

For example, the amount of hydroxyl groups on the support surface may be 0.1 mmol/g to 10 mmol/g or 0.5 mmol/g to 5 mmol/g. The amount of the hydroxyl groups on the support surface may be controlled by a preparation method of the support and preparation conditions, or drying conditions, for example, temperature, time, vacuum or spray drying, etc. When the amount of hydroxyl groups is too small, reactive sites with the cocatalyst may be reduced. When the amount of hydroxyl groups is too large, it may be caused by moisture besides the hydroxyl groups present on the surface of support particles.

Among the above-mentioned supports, the silica prepared by calcining silica, particularly, silica gel, has little catalyst released from the surface of the support in the polymerization process of the propylene, because the functional group of the compound of Chemical Formula 1 is chemically bound to and supported on the silica support. As a result, when the polyethylene is prepared by slurry or gas-phase polymerization, a fouling phenomenon, in which polymer particles stick to the wall surface of the reactor or with each other, may be minimized.

In addition, when supported on the support, the compound of Chemical Formula 1 may be supported in an amount of about 10 μmol or more, or about 30 μmol or more, and about 100 μmol or less, or about 80 μmol or less, based on the weight of the support, e.g., about 1 g of silica. When supported within the above content range, the supported catalyst may exhibit appropriate activity, which is advantageous in terms of maintaining catalytic activity and economic feasibility.

The catalyst composition may further include one or more cocatalysts together with the above-described metallocene compound and support.

Any cocatalyst may be used as the cocatalyst, as long as it may be used in the polymerization of olefin in the presence of a general metallocene catalyst. Such a cocatalyst allows binding between the hydroxyl groups on the support and a Group 13 transition metal. In addition, since the cocatalyst exists only on the surface of the support, it may contribute to securing the unique properties of the specific hybrid catalyst composition of the present application without a fouling phenomenon in which the polymer particles stick to the wall surface of the reactor or with each other.

Further, the catalyst composition according to the present invention may include one or more cocatalyst compounds selected from the group consisting of compounds represented by the following Chemical Formulae 2 to 4, in addition to the metallocene compound:

$$-[Al(R_{10})-O]_a- \quad \text{[Chemical Formula 2]}$$

in Chemical Formula 2, $R_{10}$ is halogen; or $C_{1-20}$ hydrocarbyl substituted or unsubstituted with halogen; and a is an integer of 2 or more, $$D(R_{11})_3 \quad \text{[Chemical Formula 3]}$$

in Chemical Formula 3,

D is aluminum or boron; and $R_{11}$ is halogen; or $C_{1-20}$ hydrocarbyl substituted or unsubstituted with halogen, $$[L\text{-}H]^+[ZA_4]^- \text{or } [L]^+[ZA_4]^- \quad \text{[Chemical Formula 4]}$$

in Chemical Formula 4,

L is a neutral or cationic Lewis base;

H is a hydrogen atom;

Z is a group 13 element; and

A's are each independently $C_{6-40}$ aryl or $C_{1-20}$ alkyl, wherein $C_{6-40}$ aryl or $C_{1-20}$ alkyl is unsubstituted or substituted with one or more substituents selected from the group consisting of halogen, $C_{1-20}$ alkyl, $C_{1-20}$ alkoxy, and $C_{6-40}$ allyloxy.

Specifically, in Chemical Formula 4, $[L\text{-}H]^+$ is a Brønsted acid.

The compound represented by Chemical Formula 2 may serve as an alkylating agent and an activating agent, the compound represented by Chemical Formula 3 may serve as an alkylating agent, and the compound represented by Chemical Formula 4 may serve as an activating agent.

The compound represented by Chemical Formula 2 is not particularly limited as long as it is alkylaluminoxane, and it may be, for example, methylaluminoxane, ethylaluminoxane, isobutylaluminoxane, butylaluminoxane, etc., and preferably, methylaluminoxane.

The compound represented by Chemical Formula 3 is not particularly limited, as long as it is an alkyl metal compound, and it may be, for example, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and it may be preferably selected from trimethylaluminum, triethylaluminum, and triisobutylaluminum.

Examples of the compound represented by Chemical Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, tributylammoniumtetra(p-trifluoromethylphenyl)boron, triphenylcarboniumtetra(p-trifluoromethylphenyl)boron, triphenylcarboniumtetrapentafluorophenylboron, etc. Preferably, aluminoxane may be used, and more preferably, methylaluminoxane (MAO) which is alkylaluminoxane may be used.

Further, the catalyst composition may include the cocatalyst and the metallocene compound of Chemical Formula 1 at a molar ratio of about 1:1 to about 1:10000, and preferably, at a molar ratio of about 1:1 to about 1:1000, and more preferably, at a molar ratio of about 1:10 to about 1:100. In this regard, when the molar ratio is less than about 1, the metal content of the cocatalyst is too small and thus the catalyst active species is not well formed, and as a result, the activity may be lowered. When the molar ratio is more than about 10000, the metal of the cocatalyst may act as a catalyst poison.

The supporting amount of the cocatalyst may be about 3 mmol to about 25 mmol, or about 5 mmol to about 20 mmol, based on 1 g of the support.

Meanwhile, the catalyst composition may be prepared by a method of preparing the catalyst composition including the support on which the cocatalyst and the metallocene compound are supported, the method including the steps of supporting the cocatalyst on the support, and supporting the metallocene compound on the support on which the cocatalyst has been supported.

In the method, the supporting conditions are not particularly limited, and the supporting may be performed within the range well-known to those skilled in the art. For example, high-temperature supporting and low-temperature supporting may be appropriately performed, and the supporting temperature may be, for example, in the range of about −30° C. to about 150° C., preferably about 50° C. to about 98° C., or about 55° C. to about 95° C. The supporting time may be appropriately controlled depending on the amount of a first metallocene compound to be supported. The supported catalyst thus reacted may be used as it is after removing the reaction solvent by filtration or distillation under reduced pressure, and if necessary, it may be used after soxhlet filtering with aromatic hydrocarbon such as toluene.

In addition, the preparation of the supported catalyst may be carried out in the presence or absence of a solvent. When a solvent is used, applicable solvents may include aliphatic hydrocarbon solvents such as hexane or pentane, aromatic hydrocarbon solvents such as toluene or benzene, hydrocarbon solvents substituted with a chlorine atom such as dichloromethane, ether solvents such as diethyl ether or tetrahydrofuran (THF), organic solvents such as acetone, ethylacetate, etc. Hexane, heptane, toluene, or dichloromethane is preferred.

Meanwhile, the polyethylene according to one embodiment of the present invention may be prepared by a method including the step of polymerizing ethylene in the presence of the catalyst composition including the metallocene compound.

The method of preparing polyethylene may be carried out by a slurry polymerization method using ethylene as a raw material or using ethylene and alpha-olefin as raw materials in the presence of the above-described catalyst composition and by applying a common apparatus and contact technology.

The method of preparing polyethylene may homopolymerize ethylene or may copolymerize ethylene and alpha-olefin using a continuous slurry polymerization reactor, a loop slurry reactor, etc., but is not limited thereto.

In addition, the alpha-olefin may include alpha-olefin having 4 to 20 carbon atoms, or 4 to 15 carbon atoms, or 4 to 12 carbon atoms, and specifically, the alpha-olefin may be one or more selected from the group consisting of 1-butene, 1-pentene, 1-hexene, 4-methyl-1-pentene, 1-octene, 1-decene, 1-dodecene, 1-tetradecene, 1-hexadecene 1-octadecene, and 1-eicocene, or a mixture of two or more thereof. Preferably, the alpha-olefin may be 1-butene or 1-hexene.

Specifically, in the method of preparing polyethylene, for example, 1-butene may be used as the alpha-olefin.

Meanwhile, in the copolymerization step, the alpha-olefin comonomer may be injected in such an amount that the alpha-olefin-derived repeating unit is included in an appropriate amount in the polyethylene as described above. For example, the alpha-olefin monomer may be injected in such an amount that the alpha-olefin-derived repeating unit is included in an amount of about 5 mol % or less, or about 0 mol % to about 5 mol % in the polyethylene obtained by the copolymerization process. Specifically, the input amount of the alpha-olefin comonomer may be controlled in the above-described range with reference to the content of the alpha-olefin-derived repeating unit included in the polyethylene.

For example, the copolymerization step may be performed by reacting about 0.05 mole or less, or 0 mole to about 0.05 mole of alpha-olefin, based on 1 mole of ethylene. When the reaction is allowed in the above range, polyethylene may exhibit superior processability. Preferably, the alpha-olefin may be reacted in an amount of about 0.048 mole or less, or 0.045 mole or less, or 0.042 mole or less, or 0.04 mole or less, or 0.038 mole or less, or 0.035 mole or less, based on 1 mole of ethylene. Considering the effect of improving processability according to control of the content of the alpha-olefin-derived repeating unit, the alpha-olefin may be preferably reacted in an amount of 0.005 mole or more, or 0.01 mole or more, or 0.012 mole or more, or 0.015 mole or more, or 0.018 mole or more, or 0.02 mole or more, based on 1 mole of the ethylene.

Specifically, the copolymerization step may be performed by injecting 10 mL/min or less or 0 mL/min to 10 mL/min of alpha-olefin while injecting 10 kg/hr of ethylene. The alpha-olefin monomer may be injected in the above-described range such that the appropriate amount of the alpha-olefin-derived repeating unit is included in the polyethylene. More specifically, the alpha-olefin may be reacted in an amount of 8.0 mL/min or less, or 6.0 mL/min or less, or 5.0 mL/min or less, or 4.5 mL/min or less, or 4.2 mL/min or less, or 4.0 mL/min or less, or 3.8 mL/min or less, or 3.5 mL/min or less, or 3.0 mL/min or less, or 2.6 mL/min or less, when 10 kg/hr of ethylene is injected. However, considering the effect of improving processability according to control of the content of the alpha-olefin-derived repeating unit, the alpha-olefin may be reacted in an amount of 0.1 mL/min or more, or 0.5 mL/min or more, or 1.0 mL/min or more, or 1.3 mL/min or more, or 1.5 mL/min or more, or 1.8 mL/min or more, or 1.9 mL/min or more, or 2.0 mL/min or more, or 2.1 mL/min or more, when 10 kg/hr of ethylene is injected.

Further, the polymerization temperature may be about 25° C. to about 500° C., or about 25° C. to about 300° C., or about 30° C. to about 200° C., or about 50° C. to about 150° C., or about 60° C. to about 120° C. Further, the polymerization pressure may be about 1 $kgf/cm^2$ to about 100 $kgf/cm^2$, or about 1 $kgf/cm^2$ to about 50 $kgf/cm^2$, or about 5 $kgf/cm^2$ to about 45 $kgf/cm^2$, or about 7 $kgf/cm^2$ to about 40 $kgf/cm^2$, or about 9 $kgf/cm^2$ to about 35 $kgf/cm^2$.

The catalyst composition including the metallocene compound of Chemical Formula 1 according to the present invention may be injected after being dissolved or diluted in an aliphatic hydrocarbon solvent having 5 to 12 carbon atoms, for example, pentane, hexane, heptane, nonane, decane, and isomers thereof, and an aromatic hydrocarbon solvent such as toluene and benzene, or a hydrocarbon solvent substituted with a chlorine atom such as dichloromethane and chlorobenzene. The solvent used herein is preferably used after removing a small amount of water or air, which acts as a catalyst poison, by treating with a small amount of alkyl aluminum. It is possible to further use the cocatalyst.

Further, the polymerization step may be performed by injecting about 15 ppm to about 800 ppm of hydrogen gas, based on the amount of ethylene. Preferably, the hydrogen gas may be injected in an amount of about 20 ppm or more, or about 25 ppm or more, or about 30 ppm or more, or about 50 ppm or more, or about 60 ppm or more, or about 80 ppm or more, or about 90 ppm or more, or about 95 ppm or more, or about 100 ppm or more, and about 500 ppm or less, or about 400 ppm or less, or about 350 ppm or less, or about 300 ppm or less, or about 250 ppm or less, or about 200 ppm or less, or about 180 ppm or less, or about 170 ppm or less, or about 165 ppm or less, or about 160 ppm or less, or about 155 ppm or less, based on the amount of ethylene. For example, the hydrogen gas may be injected in an amount of about 0.15 g/hr to about 8 g/hr, when 10 kg/hr of ethylene is injected, and a preferred range is the same as described above. More specifically, in the polymerization step, the hydrogen gas may be injected in an amount of about 1.09 g/hr to about 1.51 g/hr, when 10 kg/hr of ethylene is injected.

In such a process of polymerizing ethylene, the catalyst composition including the metallocene compound of the present invention may exhibit high catalytic activity. For example, during ethylene polymerization, the catalytic activity may be about 4.0 kg PE/g·cat·hr or more, or about 4.0 kg PE/g·cat·hr to about 50 kg PE/g·cat·hr, when calculated as a ratio of the weight (kg PE) of the produced polyethylene per the weight (g) of the catalyst composition used, based on the unit time (hr). Specifically, the activity of the catalyst composition may be about 4.2 kg PE/g·cat·hr or more, or about 4.3 kg PE/g·cat·hr or more, or about 4.5 kg PE/g·cat·hr or more, or about 40 kg PE/g·cat·hr or less, or about 30 kg PE/g·cat·hr or less, or about 15 kg PE/g·cat·hr or less.

The method of preparing polyethylene may provide a polyethylene having excellent physical properties by performing slurry polymerization in the presence of the above-described catalyst composition.

In particular, the catalyst composition including the metallocene compound of Chemical Formula 1 according to the present invention may exhibit high activity as described above during homopolymerization of ethylene or copolymerization of ethylene and alpha-olefin.

The polyethylene prepared by the above-described method of one embodiment has a narrow molecular weight distribution due to a uniform reaction of ethylene and hydrogen in a reactor by increasing the input amount of hydrogen and having the minimal polymer distribution in the low molecular weight region according to GPC and GC-FID analysis and a remarkably reduced generation of TVOCs by optimizing a melt index ($MI_{2.16}$, ASTM D 1238, 190° C., 2.16 kg) and a melt flow rate ratio (MFRR, $MI_5/MI_{2.16}$), thereby being suitably applied to fiber products.

Specifically, provided is a spunbond nonwoven fabric made of the above-described polyethylene fibers.

For example, in order to improve the texture of the surface, a polypropylene resin is mixed with the above-described polyethylene resin to prepare a bicomponent fiber by co-extrusion, in which the polypropylene resin or a polyethylene terephthalate resin is used for the interior and the polyethylene resin is used for the exterior, thereby providing a nonwoven fabric with improved texture and softness. In particular, when the polyethylene of the present invention is used, it is possible to minimize occurrence of single yarns even in a spinning process of bicomponent fibers, which is performed at a high temperature, as compared to a general fiber spinning process. Thus, fibers may be less broken and fume generation may be remarkably reduced.

Hereinafter, preferred exemplary embodiments are provided for better understanding of the present invention. However, the following exemplary embodiments are provided only for understanding the present invention more easily, but the content of the present invention is not limited thereby.

EXAMPLE

Preparation of Catalyst Precursor

Synthesis Example 1

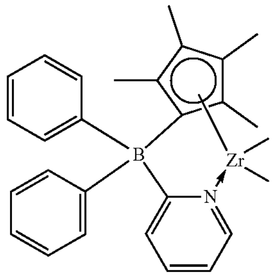

2-Bromopyridine (1 eq.) was dissolved in tetrahydrofuran (0.1 M), and then n-butyllithium (1 eq.) was slowly added dropwise at −90° C., followed by stirring at the same temperature for 1 hour. Then, chlorodiphenylborane (1 eq.) was dissolved in toluene (0.3 M), which was then slowly added dropwise to the first reaction product at −78° C., followed by stirring for 1 hour. Thereafter, stirring was performed at room temperature for 12 hours, and the solvent was dried under vacuum, and toluene was added, and a filtrate obtained by removing solids through a filter was dried under vacuum to obtain diphenyl(pyridin-2-yl)borane.

The diphenyl(pyridin-2-yl)borane (1 eq.) was dissolved in tetrahydrofuran (0.1 M), and then a solution of lithium tetramethylcyclopentadienide ($Li(CpMe_4)$, 1 eq.) dissolved in tetrahydrofuran (0.1 M) was slowly added dropwise at 0° C., followed by stirring at room temperature overnight. The solvent was dried under vacuum, and toluene/diethyl ether (a volume ratio of 3/1, 0.3 M) was introduced to dissolve, and $MCl_4$ (1 eq.) was mixed with toluene (0.2 M), which was then introduced at −78° C., followed by stirring at room temperature overnight. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered and dried under vacuum to obtain dichloro{diphenyl(pyridin-2-yl-κN)($\eta^5$-2,3,4,5-tetramethylcyclopenta-2,4-dien-1-ylidene)borate}zirconium (IV).

Dichloro{diphenyl(pyridin-2-yl-κN)($\eta^5$-2,3,4,5-tetramethylcyclopenta-2,4-dien-1-ylidene)borate}zirconium(IV) (1 eq.) was dissolved in toluene/diethyl ether (a volume ratio of 3/1, 0.3 M), and then a solution of methyl lithium (2 eq.) dissolved in hexane or diethyl ether was slowly added dropwise at −78° C., followed by stirring at room temperature for 12 hours. When the reaction was completed, the solvent was dried under vacuum, and dichloromethane was introduced and salts were removed through a filter. The filtrate was dried under vacuum, and then recrystallization was performed by adding dichloromethane/hexane. The resulting solids were filtered, and dried under vacuum to obtain a precursor compound.

$^1H$ NMR (500 MHz, $CDCl_3$, ppm): δ 8.32 (d, 1H), 8.05 (d, 4H), 7.70 (t, 1H), 7.42 (t, 1H), 7.40 (t, 4H), 7.23 (d, 1H), 7.17 (t, 2H), 2.08 (s, 6H), 1.93 (s, 6H) 0.95 (s, 6H)

Comparative Synthesis Example 1 t-butyl-O—$(CH_2)_6$—Cl was prepared by a method described in a literature (Tetrahedron Lett. 2951(1988))

using 6-chlorohexanol, and reacted with cyclopentadienyl sodium (NaCp) to obtain t-butyl-O—$(CH_2)_6$—$C_5H_5$ (yield 60%, b.p. 80° C./0.1 mmHg).

Further, t-butyl-O—$(CH_2)_6$—$C_5H_5$ was dissolved in THF at −78° C., and n-butyl lithium (n-BuLi) was slowly added thereto. Thereafter, it was heated to room temperature and reacted for 8 hours. The lithium salt solution synthesized as described above was slowly added to a suspension solution of $ZrCl_4(THF)_2$ (170 g, 4.50 mmol)/THF (30 mL) at −78° C., and further reacted for about 6 hours at room temperature. All volatiles were removed by drying under vacuum and the resulting oily liquid material was filtered by adding hexane. The filtered solution was dried under vacuum, and hexane was added to obtain a precipitate at a low temperature (−20° C.). The obtained precipitate was filtered at a low temperature to obtain a white solid of a [t-Bu-O—$(CH_2)_6$—$C_5H_4]_2ZrCl_2$ compound (yield 92%).

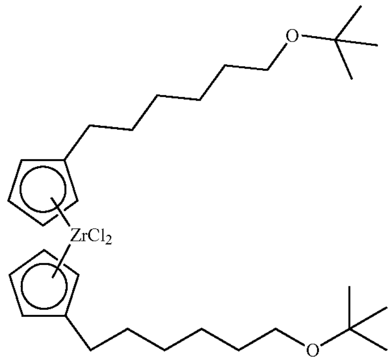

$^1$H NMR (300 MHz, $CDCl_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR ($CDCl_3$): 135.09, 116.66, 112.28, 72.42, 61.52, 30.66, 30.61, 30.14, 29.18, 27.58, 26.00.

Comparative Synthesis Example 2

Preparation of Ligand Compound 50 g of Mg (s) was added to a 10 L reactor at room temperature, followed by adding 300 mL of THF. About 0.5 g of 12 was added, and the reactor temperature was maintained at 50° C. After the reactor temperature was stabilized, 250 g of 6-t-buthoxyhexyl chloride was added to the reactor at a rate of 5 mL/min using a feeding pump. By adding 6-t-butoxyhexyl chloride, about 4° C. to 5° C. increase in the reactor temperature was observed. The mixture was stirred for 12 hours while continuously adding 6-t-butoxyhexyl chloride. 12 hours after reaction, a black reaction solution was obtained. 2 mL of the resulting black solution was taken and water was added thereto to obtain an organic layer, which was identified as 6-t-butoxyhexane by $^1$H-NMR. A successful Grignard reaction was confirmed from 6-t-butoxyhexane. Consequently, 6-t-buthoxyhexyl magnesium chloride was synthesized.

500 g of methylsilyltrichloride ($MeSiCl_3$) and 1 L of THF were added to a reactor, and then the reactor temperature was cooled to −20° C. 560 g of the synthesized 6-t-buthoxyhexyl magnesium chloride was added to the reactor at a rate of 5 mL/min using a feeding pump. After completing feeding of the Grignard reagent, the mixture was stirred for 12 hours while slowly raising the reactor temperature to room temperature. 12 hours after reaction, production of white $MgCl_2$ salts was observed. 4 L of hexane was added thereto, and salts were removed through labdori to obtain a filter solution. The filter solution thus obtained was added to the reactor, and then hexane was removed at 70° C. to obtain a light yellow liquid. The liquid thus obtained was identified as a desired methyl(6-t-buthoxy hexyl)dichlorosilane compound by $^1$H-NMR.

$^1$H-NMR ($CDCl_3$): 3.3 (t, 2H), 1.5 (m, 3H), 1.3 (m, 5H), 1.2 (s, 9H), 1.1 (m, 2H), 0.7 (s, 3H).

1.2 mol (150 g) of tetramethylcyclopentadiene and 2.4 L of THF were added to the reactor, and then reactor temperature was cooled to −20° C. 480 mL of n-BuLi was added to the reactor at a rate of 5 mL/min using a feeding pump. After addition of n-BuLi, the mixture was stirred for 12 hours while slowly raising the reactor temperature to room temperature. 12 hours after reaction, an equivalent of methyl (6-t-buthoxy hexyl)dichlorosilane (326 g, 350 mL) was rapidly added to the reactor. The mixture was stirred for 12 hours while slowly raising the reactor temperature to room temperature. Then, the reactor temperature was cooled to 0° C., and then 2 equivalents of t-$BuNH_2$ were added. The mixture was stirred for 12 hours while slowly raising the reactor temperature to room temperature. 12 hours after reaction, THF was removed and 4 L of hexane was added thereto, and salts were removed through labdori to obtain a filter solution. The filter solution was added to the reactor, and then hexane was removed at 70° C. to obtain a yellow solution. The yellow solution thus obtained was identified as a methyl(6-t-buthoxyhexyl)(tetramethylCpH)t-butylaminosilane compound by H-NMR.

Preparation of Metallocene Compound $TiCl_3(THF)_3$ (10 mmol) was rapidly added to the dilithium salt of the ligand at −78° C., which was synthesized from n-BuLi and the ligand compound, dimethyl(tetramethylcyclopentadienyl)t-butylaminosilane in the THF solution. The reaction solution was stirred for 12 hours while slowly raising temperature from −78° C. to room temperature. After stirring for 12 hours, an equivalent of $PbCl_2$ (10 mmol) was added to the reaction solution at room temperature, followed by stirring for 12 hours. After stirring for 12 hours, a dark black solution rendering a blue color was obtained. After THF was removed from the produced reaction solution, hexane was added to filter the product. After hexane was removed from the filter solution, the solution was identified by $^1$H-NMR as a (tBu-O—$(CH_2)_6)(CH_3)Si(C_5(CH_3)_4)$(tBu-N)$TiCl_2$ compound which is a desired [methyl(6-t-buthoxyhexyl)silyl(η5-tetramethylCp)(t-Butylamido)]$TiCl_2$.

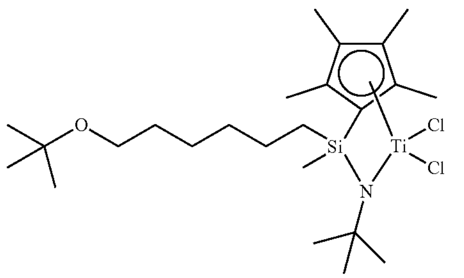

$^1$H-NMR ($CDCl_3$): 3.3 (s, 4H), 2.2 (s, 6H), 2.1 (s, 6H), 1.8~ 0.8 (m), 1.4 (s, 9H), 1.2 (s, 9H), 0.7 (s, 3H).

Preparation of Supported Catalyst

Preparation Example 1

50 mL of toluene was added to a pico reactor, and then 7 g of silica gel (SYLOPOL 952X, calcinated under 250° C.) was added under Ar, and then methylaluminoxane(MAO) 8.5 mmol/g-$SiO_2$ was slowly injected at room temperature and allowed to react under stirring at 95° C. for 24 hours. After completing the reaction, the solution was cooled to room temperature, and left for 15 minutes, and the solvent was decanted using a cannula. Toluene (400 mL) was added, and stirred for 1 minute and left for 15 minutes, and then the solvent was decanted using a cannula.

60 μmol of the metallocene compound of Synthesis Example 1 was dissolved in 30 mL of toluene, and transferred to a reactor using a cannula, and allowed to react under stirring at 80° C. for 2 hours. When the reaction was completed and precipitation was completed, the solution was cooled to room temperature and left for 15 minutes, and the solvent was decanted using a cannula. The supernatant was removed, and the remaining reaction product was washed with toluene. After washing again with hexane, 2 wt % of N,N-bis(2-hydroxyethyl)pentadeylamine (Atmer 163) as an antistatic agent, based on the weight of silica (g), was dissolved in 3 mL of hexane, followed by stirring at room temperature for 10 minutes. When the reaction was completed and precipitation was completed, the supernatant was removed and the remaining product was transferred to a glass filter to remove the solvent.

Primary drying was performed at room temperature under vacuum for 5 hours, and secondary drying was performed at 45° C. under vacuum for 4 hours to obtain a silica supported metallocene catalyst in the form of solid particles.

Comparative Preparation Example 1

3.0 kg of a toluene solution was added to a 20 L stainless steel (sus) high-pressure reactor, and the reactor temperature was maintained at 40° C. 500 g of silica (Grace Davison, SP2212) dehydrated at a temperature of 600° C. for 12 hours under vacuum was added to the reactor to sufficiently disperse the silica. 2.78 kg of 10 wt % methylaluminoxane (MAO)/toluene solution was added, and stirred at 80° C., 200 rpm for 15 hours or longer.

The reactor temperature was decreased to 40° C., and then 200 g of the first metallocene compound prepared in Comparative Synthesis Example 1/toluene solution (7.8 wt % in toluene) was added to the reactor, followed by stirring at 200 rpm for 1 hour. Subsequently, 220 g of the second metallocene compound prepared in Comparative Synthesis Example 2/toluene solution (7.8 wt % in toluene) was added to the reactor, followed by stirring at 200 rpm for 1 hour.

70 g of a cocatalyst (anilinium tetrakis(pentafluorophenyl)borate) was diluted with toluene, and the solution was added to the reactor, followed by stirring at 200 rpm for 15 hours or longer. The reactor temperature was decreased to room temperature, and then stirring was stopped, followed by settling for 30 minutes. Then, the reaction solution was decanted.

The toluene slurry was transferred to a filter dryer, followed by filtering. 3.0 kg of toluene was added and stirred for 10 minutes. Then, the stirring was stopped, followed by filtering. 3.0 kg of hexane was added to the reactor, followed by stirring for 10 minutes. Then, the stirring was stopped, followed by filtering. The product was dried at 50° C. under reduced pressure for 4 hours to prepare a 450 g-$SiO_2$ supported catalyst of Comparative Preparation Example 1.

Comparative Preparation Example 2

A silica supported metallocene catalyst was prepared in the same manner as in Example 1. However, a metallocene compound of the following Chemical Formula A was used instead of the metallocene compound of Synthesis Example 1 to prepare a silica supported metallocene catalyst of Comparative Preparation Example 2.

[Chemical Formula A]

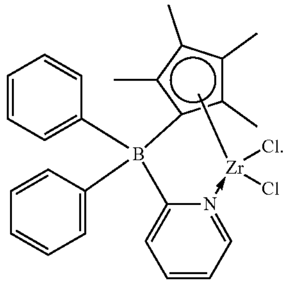

Preparation of Polyethylene

Example 1

The metallocene catalyst prepared in Preparation Example 1 was put into a 220 L reactor of a pilot plant in a single slurry polymerization process to prepare a high-density polyethylene according to the common method. 10 kg/hr of ethylene and 1.09 g/hr of hydrogen were continuously reacted in a hexane slurry state at a reactor temperature of 80° C. Here, 2.23 mL/min of 1-butene was added as a comonomer. After the reaction, a high-density polyethylene in the form of powder was prepared through solvent removal and drying processes.

Example 2

A high-density polyethylene (ethylene/1-butene copolymer) of Example 2 in the form of powder was prepared in the same polymerization process as in Example 1, except that the input amounts of hydrogen and 1-butene were changed to 1.20 g/hr and 2.49 mL/min, respectively.

Example 3

A high-density polyethylene (ethylene/1-butene copolymer) of Example 3 in the form of powder was prepared in the same polymerization process as in Example 1, except that the input amounts of hydrogen and 1-butene were changed to 1.47 g/hr and 2.52 mL/min, respectively.

Example 4

A high-density polyethylene (ethylene/1-butene copolymer) of Example 4 in the form of powder was prepared in the same polymerization process as in Example 1, except that the input amounts of hydrogen and 1-butene were changed to 1.13 g/hr and 2.34 mL/min, respectively.

Example 5

A high-density polyethylene (ethylene/1-butene copolymer) of Example 5 in the form of powder was prepared in the same polymerization process as in Example 1, except that the input amounts of hydrogen and 1-butene were changed to 1.51 g/hr and 2.20 mL/min, respectively.

Example 6

A high-density polyethylene (ethylene/1-butene copolymer) of Example 6 in the form of powder was prepared in the same polymerization process as in Example 1, except that the input amounts of hydrogen and 1-butene were changed to 1.48 g/hr and 2.11 mL/min, respectively.

Comparative Example 1

A high-density polyethylene (ethylene/1-butene copolymer) of Comparative Example 1 in the form of powder was prepared in the same polymerization process as in Example 1, except that the hybrid supported catalyst prepared in Comparative Preparation Example 1 was used instead of the metallocene catalyst prepared in Preparation Example 1.

Comparative Example 2

ME9180 (LG Chemical) prepared using a Ziegler-Natta catalyst was used as a polyethylene (ethylene/1-butene copolymer) of Comparative Example 2.

Comparative Example 3

SK MK910 (SK Chemical) prepared using a Ziegler-Natta catalyst was used as a polyethylene (ethylene/1-butene copolymer) of Comparative Example 3.

Comparative Example 4

MM810 (SK Chemical) which is a high-density polyethylene (HDPE) having a melt index $MI_{2.16}$ (MI, load of 2.16 kg, 190° C.) of 30.8 g/10 min and a density of 0.954 g/$cm^3$ was used as a polyethylene (ethylene/1-butene copolymer) of Comparative Example 4.

Comparative Example 5

7200F (Formosa Plastics) which is a high-density polyethylene (HDPE) having a melt index $MI_{2.16}$ (MI, load of 2.16 kg, 190° C.) of 22.0 g/10 min and a density of 0.955 g/$cm^3$ was used as a polyethylene (ethylene/1-butene copolymer) of Comparative Example 5.

Comparative Example 6

A high-density polyethylene (ethylene/1-butene copolymer) of Comparative Example 6 in the form of powder was prepared in the same polymerization process as in Example 1, except that the metallocene catalyst prepared in Comparative Preparation Example 2 was used instead of the metallocene catalyst prepared in Preparation Example 1.

Comparative Example 7

A high-density polyethylene (ethylene homopolymer) of Comparative Example 7 in the form of powder was prepared in the same polymerization process as in Comparative Example 1, except that ethylene alone was polymerized without 1-butene as a copolymer.

Experimental Example 1: Evaluation of Physical Properties of Polyethylene

Physical properties were evaluated and the compound content in the low molecular weight region were analyzed for the polyethylenes prepared in Examples and Comparative Examples by the following methods, and the results are shown in Table 1 below.

(1) Melt Index

A melt index ($MI_{2.16}$) and a melt index ($MI_5$) were measured at 190° C. under a load of 2.16 kg and 5 kg according to American Society for Testing and Materials (ASTM) D 1238 (condition E), respectively, and the weight (g) of the polymer melted for 10 minutes was recorded as the melt index.

(2) Melt Flow Rate Ratio (MFRR, $MI_5/MI_{2.16}$)

A melt flow rate ratio is a ratio ($MI_5/MI_{2.16}$) obtained by dividing the melt index $MI_5$ (MI, load of 5 kg) by $MI_{2.16}$ (MI, load of 2.16 kg).

(3) Density (g/$cm^3$)

A density (g/$cm^3$) of the polyethylene was measured according to American Society for Testing and Materials (ASTM) D 1505.

(4) Weight Average Molecular Weight and Molecular Weight Distribution (PDI, Polydispersity Index, Mw/Mn) and Log MW (3.0 or Less) Ratio According to GPC Analysis A molecular weight distribution (PDI, Mw/Mn) was determined by measuring a weight average molecular weight (Mw) and a number average molecular weight (Mn) of the polymer using gel permeation chromatography (GPC, manufactured by Water), and then dividing the weight average molecular weight by the number average molecular weight.

In detail, PL-GPC220 manufactured by Waters was used as the gel permeation chromatography (GPC) instrument, and a Polymer Laboratories PLgel MIX-B 300 mm length column was used. At this time, the evaluation temperature was 160° C., and 1,2,4-trichlorobenzene was used as a solvent and a flow rate was 1 mL/min. Each of the polymer samples of Examples and Comparative Examples was pretreated by dissolving in 1,2,4-trichlorobenzene containing 0.0125% of butylated hydroxytoluene (BHT) at 160° C. for 10 hours using a GPC analyzer (PLGP220), and prepared at a concentration of 10 mg/10 mL, and then fed in an amount of 200 μL. Mw and Mn were obtained using a calibration curve formed using polystyrene standard specimens. 9 kinds of the polystyrene standard specimens having a weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

In addition, a ratio (%) of an integral value in the region where Log MW is 3.0 or less to a total integral value in a log graph with respect to the weight average molecular weight (Mw) of the polyethylene thus measured, which is a GPC curve graph wherein the x-axis is log Mw and the y-axis is dw/dlogMw, was calculated and shown in Table 1 below.

(5) GC Mass

About 50 mg of a sample prepared using each of the polyethylenes prepared in Examples and Comparative Examples was weighed, and subjected to gas chromatography/flame ionization detector analysis (GC-FID) under the following conditions.

[GC/FID Analysis Conditions]

GC instrument: 7890A GC system manufactured by Agilent

GC oven: 100° C. (5 min)–15° C./min-320° C. (20 min)

Inlet, Detector temperature: 300° C.

Further, in the gas chromatography/flame ionization detector (GC-FID) analysis, the polyethylene samples were subjected to a pretreatment process as follows: In detail, 0.5 g of the polyethylene sample was dissolved in 10 mL of xylene, the resin component was precipitated by adding 10 mL of ethanol, followed by centrifuging. The supernatant was dried with nitrogen ($N_2$) gas to remove the solvent, the product was dissolved in trichloromethane ($CHCl_3$) or in a mixed solvent ($CHCl_3$/acetone) of trichloromethane and acetone, and the solution was injected into the measuring instrument.

In the graph obtained through GC-FID analysis performed under the above-described conditions, a peak area of linear hydrocarbon having 3 to 32 carbon atoms was converted into a ratio with respect to a peak area of polyethylene, and the content (ppm) of the linear hydrocarbon having 3 to 32 carbon atoms based on 1 g of the polyethylene was determined.

(6) Emission Amount of Total Volatile Organic Compounds (TVOCs)

The polyethylenes prepared in Examples and Comparative Examples were subjected to gas chromatography/mass spectrometry-thermal desorption (GC/MS-TD) by exposing to a high temperature under the following conditions.

[GC/MS-TD Analysis Conditions]

Sample: 20 mg

Temperature and Time: 200° C. 10 min

GC oven: 50° C. (5 min)-10° C./min-300° C. (10 min)

Column: HP-5MS

Toluene standard solution

The emission amount (ug/g) of total volatile organic compounds (TVOCs) was calculated, as shown in Equation 1 below.

$$VOC_{compound}=[(A_{compound}/A_{std})\times C_{std}]/W_{sample} \quad \text{[Equation 1]}$$

$VOC_{compound}$: VOC value (ug/g) of an individual material generated from a test sample $A_{compound}$: chromatogram area of a peak of the individual material generated from the test sample $A_{std}$: a peak area of a toluene standard solution $C_{std}$: a weight (ug) of toluene injected using the toluene standard solution $W_{sample}$: a weight (g) of the test sample The results of the gas chromatography/mass spectrometry-thermal desorption (GC/MS-TD) analysis are obtained as a value (ug/g) calculated from the peak area versus the peak area of the toluene standard solution.

TABLE 1

| | Results of measuring physical properties | | | | | Analysis of low molecular weight content | | |
|---|---|---|---|---|---|---|---|---|
| | | | | | | GPC | | |
| | $MI_{2.16}$ (g/10 min) | Density (g/cm³) | MFRR | PDI (Mw/Mn) | Mw (g/mol) | (≤logMw 3.0 Area %) | GC/FID (ppm) | TVOC (ug/g) |
| Example 1 | 18.9 | 0.954 | 2.53 | 2.39 | 48995 | 1.02 | 521 | 90 |
| Example 2 | 20.0 | 0.951 | 2.50 | 2.38 | 47986 | 1.16 | 530 | 100 |
| Example 3 | 29.6 | 0.951 | 2.54 | 2.35 | 42325 | 1.23 | 546 | 110 |
| Example 4 | 19.3 | 0.953 | 2.57 | 2.45 | 48275 | 1.13 | 450 | 50 |
| Example 5 | 30.1 | 0.954 | 2.59 | 2.44 | 43420 | 1.15 | 467 | 60 |
| Example 6 | 29.8 | 0.955 | 2.56 | 2.50 | 43970 | 1.16 | 431 | 60 |
| Comparative Example 1 | 13.4 | 0.953 | 2.80 | 2.90 | 50168 | 2.29 | 749 | 240 |
| Comparative Example 2 | 18.9 | 0.958 | 2.92 | 3.20 | 46588 | 2.35 | 872 | 250 |
| Comparative Example 3 | 19.7 | 0.956 | 2.71 | 2.72 | 47554 | 2.07 | 734 | 180 |
| Comparative Example 4 | 30.8 | 0.954 | 2.65 | 2.71 | 43043 | 2.05 | 746 | 200 |
| Comparative Example 5 | 22.1 | 0.955 | 2.90 | 3.10 | 44609 | 1.80 | 856 | 190 |
| Comparative Example 6 | 19.8 | 0.953 | 2.55 | 2.56 | 47951 | 1.57 | 647 | 180 |
| Comparative Example 7 | 20.6 | 0.960 | 2.62 | 2.57 | 47652 | 1.25 | 654 | 170 |

Referring to Table 1, the polyethylenes of Examples 1 to 3 of the present invention were confirmed to have a narrow molecular weight distribution due to a uniform reaction of ethylene and hydrogen in a reactor by increasing an input amount of hydrogen and to have the minimal polymer distribution in the low molecular weight region according to GPO and GC-FID analysis and a reduced generation of TVOCs by optimizing the melt index ($MI_{2.16}$, ASTM D 1238, 190° C., 2.16 kg) and the melt flow rate ratio (MFRR, $MI_5/MI_{2.16}$).

Accordingly, in order to improve the texture of the surface, even though a high-temperature spinning process is performed to prepare a bicomponent fiber by mixing the polypropylene resin with the polyethylene resin, in which the polypropylene resin is used for the interior and the polyethylene resin is used for the exterior, the polyethylene of the present invention may minimize occurrence of single yarns, and fibers may be less broken and fume generation may be remarkably reduced.

The invention claimed is:

1. A polyethylene, of which a melt index according to (ASTM D 1238 measured at 190° C. under loaded of 2.16 kg is 15 g/10 min to 40 g/10 min, a melt flow rate ratio (MFRR) of $MI_5/MI_{2.16}$ is 2.3 to 2.7, an integral value in a region where Log Mw is 3.0 or less in a GPC curve, wherein an x-axis is the log Mw and a y-axis is dw/d log Mw, is 0.8% to 1.8% of a total integral value, and a content of a linear hydrocarbon having 3 to 32 carbon atoms based on 1 g of the polyethylene is 600 ppm or less, when a peak area of the linear hydrocarbon having 3 to 32 carbon atoms is converted into a ratio with respect to a peak area of the polyethylene in a GC-FID graph obtained through gas chromatography/flame ionization detector analysis using GC-FID, Inlet, Detector temperature at 300° C., a residence time of 20 minutes.

2. The polyethylene of claim 1, wherein the integral value is 0.9% to 1.5% of the total integral value.

3. The polyethylene of claim 1, wherein a molecular weight distribution (Mw/Mn) is 2.0 to 2.6.

4. The polyethylene of claim 1, wherein a weight average molecular weight is 38000 g/mol to 65000 g/mol.

5. The polyethylene of claim 1, wherein the content of a linear hydrocarbon having 3 to 32 carbon atoms based on 1 g of the polyethylene is 80 ppm to 600 ppm.

6. The polyethylene of claim 1, wherein a density measured with (ASTM D 1505 at 23° C. is 0.945 g/cm$^3$ to 0.965 g/cm$^3$.

7. The polyethylene of claim 1, wherein the polyethylene comprises a homopolymer of ethylene or a copolymer of a $C_{4-20}$ alpha-olefin monomer and ethylene.

8. A method of preparing the polyethylene of claim 1, comprising polymerizing ethylene in the presence of a catalyst composition including a metallocene compound represented by Chemical Formula 1:

Chemical Formula 1

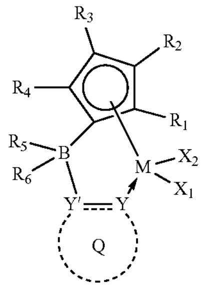

wherein in Chemical Formula 1,

B is boron,

M is a Group 4 transition metal, $R_1$ to $R_4$ are each independently hydrogen, $C_{1-20}$ alkyl, $C_{3-20}$ cycloalkyl, or $C_{6-20}$ aryl, or $R_1$ and $R_2$ or $R_3$ and $R_4$ are connected to each other to form a substituted or unsubstituted $C_{6-60}$ aromatic ring, $R_5$ and $R_6$ are each independently $C_{1-20}$ alkyl, $C_{3-20}$ cycloalkyl, or $C_{6-20}$ aryl, or $R_5$ and $R_6$ are connected to each other to form a $C_{3-60}$ aliphatic ring or a $C_{6-60}$ aromatic ring, $X_1$ and $X_2$ are each independently $C_{1-20}$ alkyl or —O(CO)R', wherein R' is $C_{1-20}$ alkyl, Q is a substituted or unsubstituted $C_{2-60}$ hetero ring including any one or more selected from the group consisting of N, O, and S, Y and Y' are elements constituting Q, Y is N, O, or S, and Y' is an element of Q, and is adjacent to Y, and is N or C.

9. The method of claim 8, wherein $R_1$ to $R_4$ are each independently hydrogen, or methyl, or $R_1$ and $R_2$ or $R_3$ and $R_4$ are connected to each other to form a benzene ring or a 1,2,3,4-tetrahydronaphthalene ring, wherein the benzene ring or the 1,2,3,4-tetrahydronaphthalene ring is unsubstituted or substituted with one substituent to four substituents selected from the group consisting of methyl, tert-butyl, and 4-tert-butyl phenyl.

10. The method of claim 8, wherein $R_5$ and $R_6$ are each independently methyl or phenyl, or $R_5$ and $R_6$ are connected to each other to form a cyclooctane ring.

11. The method of claim 8, wherein the compound represented by Chemical Formula 1 is any one of compounds represented by the following structural formulae:

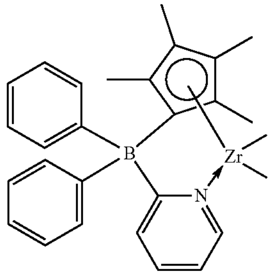

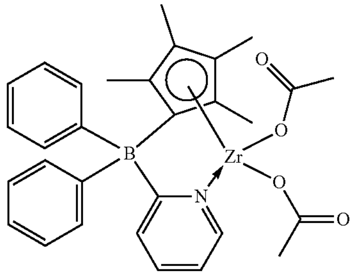

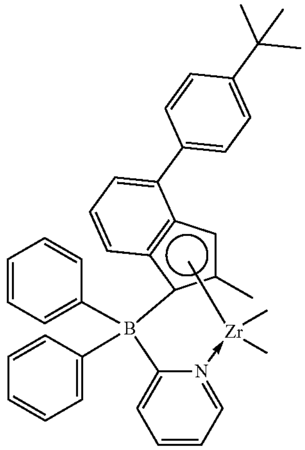

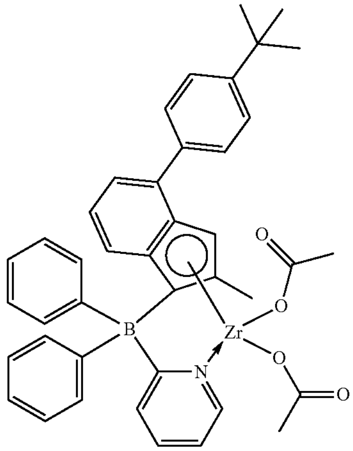

-continued
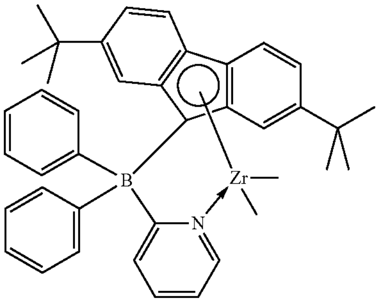
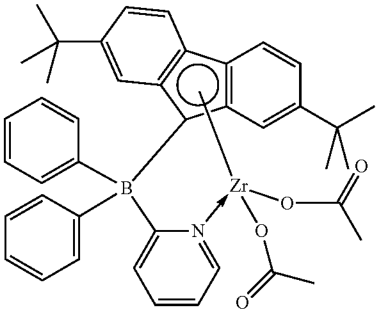
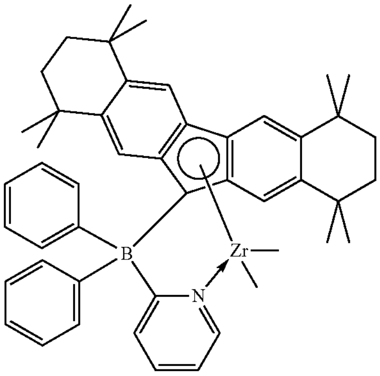
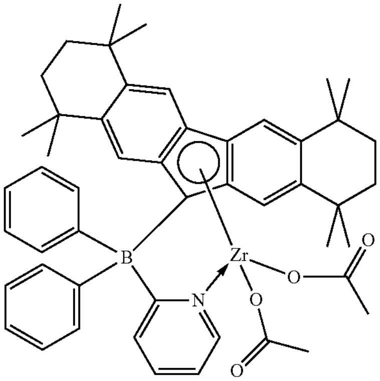
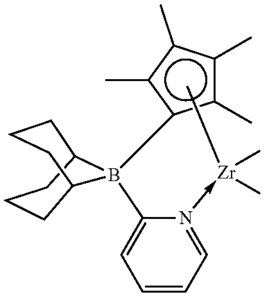
-continued
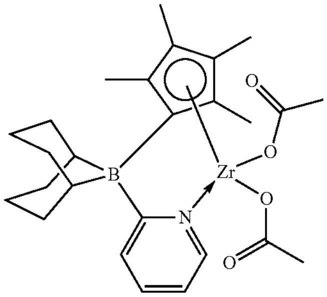
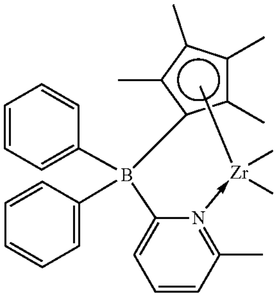
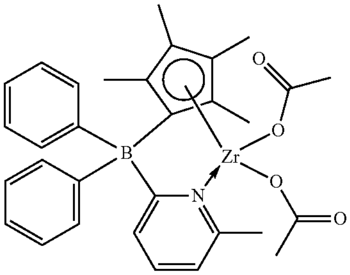
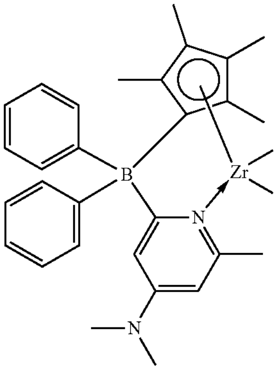
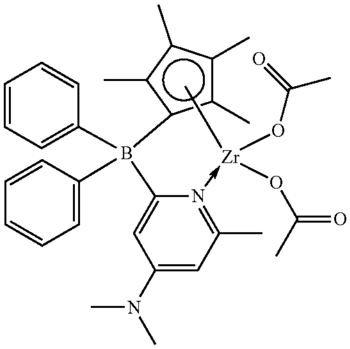

-continued
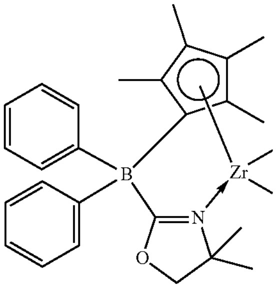
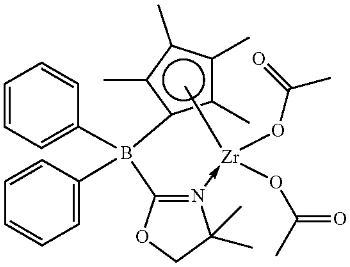
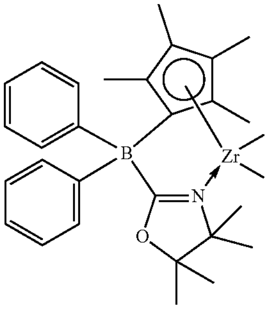
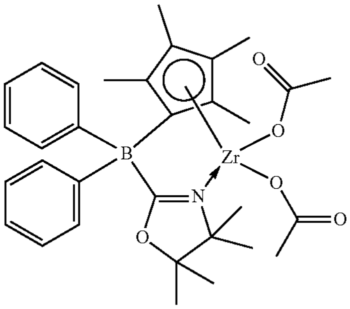
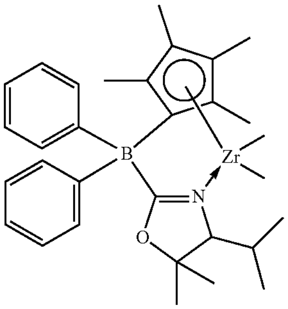
-continued
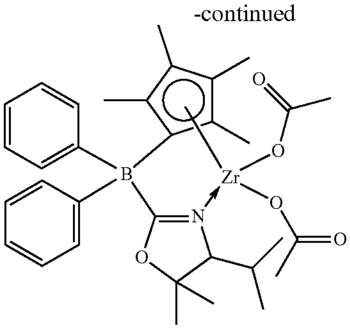
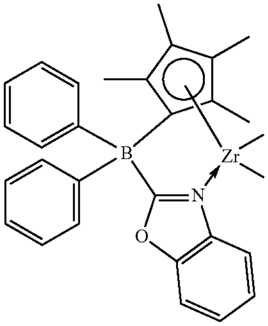
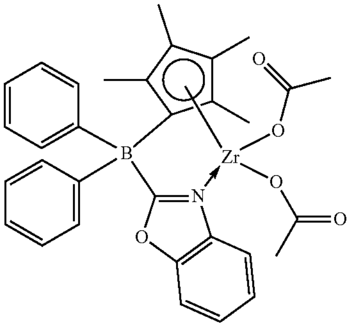
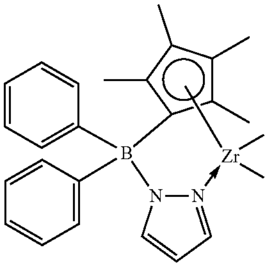
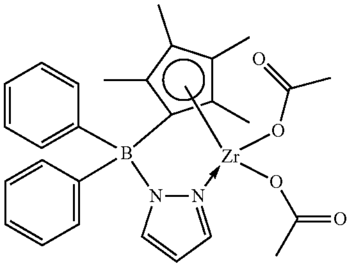
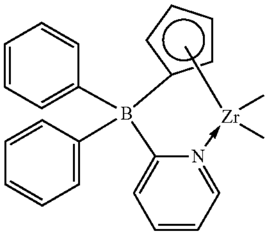

-continued

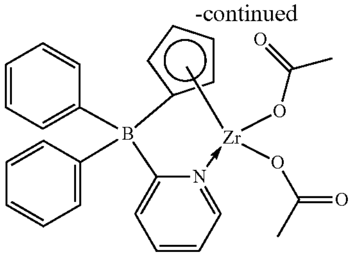

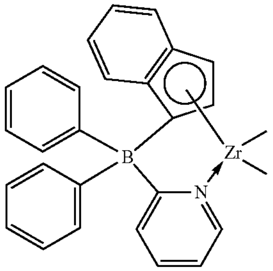

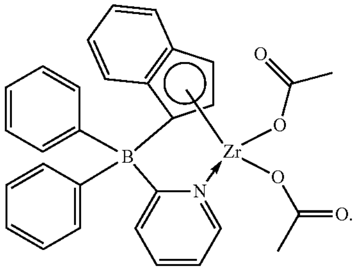

12. The method of claim 8, wherein the catalyst composition further includes one or more cocatalyst compounds selected from the group consisting of compounds represented by Chemical Formula 2 to Chemical Formula 4:

$$—[Al(R_{10})—O]_a— \qquad \text{Chemical Formula 2}$$

wherein in Chemical Formula 2, $R_{10}$ is halogen; or $C_{1-20}$ hydrocarbyl substituted or unsubstituted with halogen; and a is an integer of 2 or more, $$D(R_{11})_3 \qquad \text{Chemical Formula 3}$$

wherein in Chemical Formula 3,

D is aluminum or boron; and $R_{11}$ is halogen; or $C_{1-20}$ hydrocarbyl substituted or unsubstituted with halogen, $$[L\text{-}H]^+[ZA_4]^- \text{ or } [L]^+[ZA_4] \qquad \text{Chemical Formula 4}$$

wherein in Chemical Formula 4,

L is a neutral or cationic Lewis base;

H is a hydrogen atom;

Z is a group 13 element; and

A's are each independently $C_{6-40}$ aryl or $C_{1-20}$ alkyl, wherein $C_{6-40}$ aryl or $C_{1-20}$ alkyl is unsubstituted or substituted with one or more substituents selected from the group consisting of halogen, $C_{1-20}$ alkyl, $C_{1-20}$ alkoxy, and $C_{6-40}$ allyloxy.

* * * * *